United States Patent
Chen et al.

(10) Patent No.: US 9,755,529 B2
(45) Date of Patent: Sep. 5, 2017

(54) FLYBACK POWER CONVERTER AND CONTROLLER AND DRIVER THEREOF

(71) Applicant: RICHTEK TECHNOLOGY CORPORATION, Zhubei, HsinChu (TW)

(72) Inventors: Yu-Chang Chen, Jiji Township (TW); Li-Di Luo, HsinChu (TW); Tzu-Chen Lin, Changhua (TW)

(73) Assignee: RICHTEK TECHNOLOGY CORPORATION, Zhubei, Hsinchu (TW)

( * ) Notice: Subject to any disclaimer, the term of this patent is extended or adjusted under 35 U.S.C. 154(b) by 0 days.

(21) Appl. No.: 15/147,182

(22) Filed: May 5, 2016

(65) Prior Publication Data

US 2016/0329819 A1 Nov. 10, 2016

Related U.S. Application Data

(60) Provisional application No. 62/157,509, filed on May 6, 2015, provisional application No. 62/157,511, filed on May 6, 2015.

(51) Int. Cl.
*H02M 3/335* (2006.01)
*H02M 1/08* (2006.01)
*H02M 1/00* (2006.01)

(52) U.S. Cl.
CPC ......... *H02M 3/33515* (2013.01); *H02M 1/08* (2013.01); *H02M 3/33592* (2013.01); *H02M 2001/0006* (2013.01); *H02M 2001/0009* (2013.01); *Y02B 70/1475* (2013.01)

(58) Field of Classification Search
CPC .................... H02M 3/33515; H02M 1/08
See application file for complete search history.

(56) References Cited

U.S. PATENT DOCUMENTS

| | | | | |
|---|---|---|---|---|
| 7,787,264 B2* | 8/2010 | Yang | ............... | H02M 3/33592 363/21.06 |
| 7,889,521 B2* | 2/2011 | Hsu | ............... | H02M 3/33592 363/21.14 |
| 8,520,414 B2* | 8/2013 | Garrity | ............ | H02M 3/33569 363/21.14 |
| 2009/0257250 A1* | 10/2009 | Liu | ................ | H02M 3/33592 363/21.06 |

(Continued)

*Primary Examiner* — Emily P Pham
(74) *Attorney, Agent, or Firm* — Tung & Associates

(57) ABSTRACT

The present invention provides a flyback power converter and a control circuit thereof. The flyback power converter includes a transformer, a power switch, a driver, a synchronous rectification (SR) switch, a controller, and a signal coupler circuit. The transformer has a primary winding and a secondary winding. The power switch controls the conduction time of the primary winding; and the SR switch controls the conduction time of the secondary winding. The controller controls the SR switch and generates an ON pulse signal and an OFF pulse signal in a normal operation mode. When an output voltage reaches a lower limit voltage, the flyback power converter operates in the normal operation mode. The driver generates a switching signal according to the ON pulse signal and the OFF pulse signal in the normal operation mode, to determine a start conduction time point and an end conduction time point of the primary winding.

31 Claims, 10 Drawing Sheets

(56) References Cited

U.S. PATENT DOCUMENTS

2015/0280576 A1\* 10/2015 Hinz ................ H02M 3/33507
                                                                        363/21.15
2016/0172962 A1\* 6/2016 Chen ................ H02M 3/33592
                                                                        363/21.14

\* cited by examiner

FLYBACK POWER CONVERTER AND CONTROLLER AND DRIVER THEREOF

CROSS REFERENCE

The present invention claims priorities to U.S. 62/157,509, filed on May 6, 2015, and U.S. 62/157,511, filed on May 6, 2015.

BACKGROUND OF THE INVENTION

Field of Invention

The present invention relates to a flyback power converter, and a controller and a driver thereof; particularly, it relates to such a flyback power converter which generates an ON pulse signal and an OFF pulse signal at a secondary side of a transformer therein, which are transmitted to a primary side of the transformer to determine a start conduction time point and an end conduction time point of a primary winding, and a controller and a driver of the flyback power converter.

Description of Related Art

FIG. 1 shows a schematic diagram of a conventional flyback power converter 100. As shown in FIG. 1, a rectifier circuit 101 rectifies an alternating current (AC) voltage Vac to generate an input voltage Vin. The rectifier circuit 101 is for example a bridge rectifier circuit. A primary winding W1 of a transformer 102 of the flyback power converter 100 receives the input voltage Vin. A power switch SW controls a conduction time of the primary winding W1, and the input voltage Vin is converted to an output voltage Vout which is generated at a secondary winding W2 of the transformer 102. The flyback power converter 100 includes the aforementioned transformer 102, the power switch SW, an opto-coupler circuit 104, a pulse width modulation (PWM) controller 105, a current sense circuit 106, a synchronous rectification (SR) control circuit 107, and an SR switch circuit 108. The power switch SW is controlled by a switching signal GATE which is generated by a feedback control loop. More specifically, the PWM controller 105 generates a PWM signal according to a feedback signal COMP related to the output voltage Vout and a current sense signal CS related to a current flowing through the power switch SW. The feedback signal COMP is for example generated by the opto-coupler circuit 104 (or, alternatively, generated by an auxiliary winding which is not shown). The current sense signal CS is generated by the current sense circuit 106. The PWM signal is for generating the switching signal GATE, to control the power switch SW for converting the input voltage Vin to the output voltage Vout.

Still referring to FIG. 1, for better power conversion efficiency, the secondary winding W2 of the flyback power converter 100 is electrically connected to the SR switch circuit 108. The SR control circuit 107 controls the SR switch circuit 108 according to a voltage drop across the SR switch circuit 108. As such, the secondary winding W2 is controlled to be conductive while the primary winding W1 is not conductive, for converting the input voltage Vin to the output voltage Vout. However, if the secondary winding W2 is conductive while the primary winding W1 is still conductive, a "short through" occurs. In certain cases, for example when the flyback power converter 100 operates in a continuous conduction mode (CCM), it is possible that the SR switch circuit 108 is not timely turned OFF while the primary winding W1 is still conductive, such that the aforementioned short through occurs to damage the flyback power converter 100.

In view of the above, the present invention proposes a flyback power converter, and a controller and a driver thereof, wherein the flyback power converter generates an ON pulse signal and an OFF pulse signal at a secondary side of a transformer therein, which are transmitted to a primary side of the transformer to determine a start conduction time point and an end conduction time point of a primary winding, so as to avoid the short through problem.

SUMMARY OF THE INVENTION

From one perspective, the present invention provides a flyback power converter, comprising: a transformer, which includes: a primary winding, configured to operably receive an input voltage; and a secondary winding, configured to operably generate an output voltage; a power switch, which is coupled to the primary winding, and configured to operably control a conduction time of the primary winding; a driver, which is located at a primary side of the transformer, and configured to operably generate a switching signal to control the power switch; a synchronous rectification (SR) switch, which is coupled to the secondary winding, and configured to operably control a conduction time of the secondary winding in correspondence to a nonconductive time of the primary winding; a controller, which is coupled to the SR switch and located at a secondary side of the transformer, and configured to operably control the SR switch and generate an ON pulse signal and an OFF pulse signal in a normal operation mode; and a signal coupler circuit, which is coupled between the controller and the driver, and configured to operably convert the ON pulse signal and the OFF pulse signal to an ON trigger signal and an OFF trigger signal respectively, which are inputted to the driver; wherein when the output voltage reaches or exceeds a lower limit voltage, the flyback power converter operates in the normal operation mode, and in the normal operation mode, the driver generates the switching signal wherein a start conduction time point and an end conduction time point of the primary winding are determined according to the ON trigger signal and the OFF trigger signal respectively.

In one preferable embodiment, the signal coupler circuit includes a pulse transformer or a pulse opto-coupler, wherein input signals and output signals of the pulse transformer and the pulse opto-coupler are signals in a pulse form.

In the previous embodiment, the transformer further includes an auxiliary winding, configured to operably generate an auxiliary voltage according to the output voltage.

In one preferable embodiment, the flyback power converter further comprises a rectifier filter circuit, configured to operably generate an internal supply voltage for supplying electrical power to the driver according to the auxiliary voltage.

In one preferable embodiment, when the output voltage does not reach the lower limit voltage, the flyback power converter operates in a low voltage operation mode, and the driver includes: a low voltage mode ON time control circuit, configured to operably determine the start conduction time point and the end conduction time point of the primary winding in the low voltage operation mode, wherein the low voltage mode ON time control circuit is disabled in the normal operation mode; a normal mode ON time control circuit, which is coupled to the signal coupler circuit, and configured to operably determine the start conduction time point and the end conduction time point of the primary winding in the normal operation mode; and a switching signal generation circuit, which is coupled to the low voltage mode ON time control circuit and the normal mode ON time control circuit, and configured to operably generate the switching signal for controlling the power switch.

In one preferable embodiment, the switching signal generation circuit includes a flip-flop circuit.

In one preferable embodiment, the low voltage mode ON time control circuit includes: a sample-and-hold circuit, which is configured to operably sample and hold a signal related to the output voltage, to generate a sample-and-hold signal; an operation mode switching signal generation circuit, configured to operably generate an operation mode switching signal according to the ON trigger signal and/or the OFF trigger signal and the sample-and-hold signal; an oscillator circuit, which is coupled to the operation mode switching signal generation circuit, and configured to operably generate a clock signal and a ramp signal according to the operation mode switching signal; a comparator, which is coupled to the oscillator circuit and the operation mode switching signal generation circuit, and configured to operably generate a comparison signal according to the ramp signal, the operation mode switching signal, and a low voltage operation mode reference voltage; an OFF logic circuit, which is coupled to the comparator, and configured to operably generate a reset signal according to the comparison signal and the OFF trigger signal, wherein the reset signal is inputted to the flip-flop circuit; and an ON logic circuit, which is coupled to the oscillator circuit, and configured to operably generate an enable signal according to the clock signal and the ON trigger signal, wherein the enable signal is inputted to the flip-flop circuit; wherein when the sample-and-hold signal indicates that the output voltage is not lower than the lower limit voltage, or when the ON trigger signal indicates the start conduction time point and/or the OFF trigger signal indicates the end conduction time point of the primary winding, the operation mode switching signal disables the oscillator circuit not to generate the clock signal and the ramp signal, such that the switching signal is generated not according to the clock signal and the ramp signal, and the flyback power converter operates in the normal operation mode; wherein when the sample-and-hold signal indicates that the output voltage is lower than the lower limit voltage, and when the ON trigger signal and the OFF trigger signal do not indicate the start conduction time point nor the end conduction time point of the primary winding, the operation mode switching signal enables the oscillator circuit to generate the clock signal and the ramp signal, such that the switching signal is generated according to the clock signal and the ramp signal, and the flyback power converter operates in the low voltage operation mode.

In the aforementioned embodiment, the oscillator circuit preferably includes: a ramp signal generation circuit, which includes a capacitor, and configured to operably generate the ramp signal by charging and discharging the capacitor according to the clock signal and an inverted signal of the clock signal; and a comparator-and-logic circuit, which is coupled to the ramp signal generation circuit, and configured to operably compare the ramp signal with a high trip-point voltage, and compare the ramp signal with a low trip-point voltage, and perform a logic operation according to comparison results, to generate the clock signal and the inverted signal of the clock signal.

In one preferable embodiment, the operation mode switching signal generation circuit includes a disable circuit, which is coupled to the capacitor, and configured to operably compare the sample-and-hold signal with a threshold voltage, to control a discharge switch to discharge the capacitor to a reference level when the output voltage is not lower than the lower limit voltage, whereby the oscillator circuit is disabled and does not generate the clock signal and the ramp signal, such that the switching signal is generated not according to the clock signal and the ramp signal, and the flyback power converter operates in the normal operation mode.

In one preferable embodiment, the low voltage mode ON time control circuit further includes an analog signal adder amplifier, which is coupled to the oscillator circuit and a current sense circuit, and configured to operably generate a summation amplified voltage signal according to the ramp signal and a current sense signal generated by the current sense circuit; wherein the summation amplified voltage signal is proportional to the current sense signal, or proportional to a sum of the current sense signal and the ramp signal, by a predetermined ratio; wherein the current sense circuit is coupled to the power switch, and configured to operably generate the current sense signal according to a switch current flowing through the power switch.

In one preferable embodiment, the normal mode ON time control circuit includes: a level shifter circuit, which is coupled to the signal coupler circuit, and configured to operably generate an ON trigger level shift signal and an OFF trigger level shift signal according to the ON trigger signal and the OFF trigger signal respectively; and a determination circuit, configured to operably generate an enable signal according to an internal supply voltage related to the output voltage; wherein the flip-flop circuit is configured to operably determine the switching signal according to the ON trigger level shift signal and the OFF trigger level shift signal.

In the aforementioned embodiment, the switching signal generation circuit preferably further includes a tri-state buffer, which is coupled to the flip-flop circuit and the determination circuit, wherein the tri-state buffer is enabled when the output voltage is not lower than the lower limit voltage, and the enablement of the tri-state buffer disables the low voltage mode ON time control circuit, such that the switching signal is determined according to the ON trigger signal and the OFF trigger signal.

In one preferable embodiment, the controller includes: an SR switch control signal generation circuit, configured to operably generate an SR switch control signal according to a voltage drop sense signal and/or a pulse width modulation (PWM) signal, to control the SR switch; a PWM signal generation circuit, which is coupled to the SR switch control signal generation circuit, and configured to operably generate the PWM signal according to a feedback signal which is related to the output voltage or related to an output current; and a pulse signal generation circuit, configured to operably generate the ON pulse signal according to a level change of the PWM signal in a first direction, and generate the OFF pulse signal according to a level change of the PWM signal in a second direction.

In one preferable embodiment, the flyback power converter further comprises a voltage drop sense circuit, which is coupled between the secondary winding and the controller, and configured to operably generate the voltage drop sense signal according to a voltage drop across the SR switch.

In one preferable embodiment, the PWM signal generation circuit includes: an oscillator, configured to operably generate a clock signal and a ramp signal; a comparator, which is coupled to the oscillator, and configured to operably generate a reset signal according to the feedback signal and the ramp signal; and a flip-flop, which is coupled to the oscillator and the comparator, and configured to operably generate the PWM signal according to the clock signal and the reset signal.

In one preferable embodiment, the pulse signal generation circuit includes: an ON delay circuit, which is coupled to the PWM signal generation circuit, and configured to operably delay an inverted signal of the PWM signal for a pulse period, to generate an ON delay PWM signal; an ON logic circuit, which is coupled to the ON delay circuit, and configured to operably perform a logic operation according to the PWM signal and the ON delay PWM signal, to generate the ON pulse signal according to the level change of the PWM signal in the first direction; an OFF delay circuit, which is coupled to the PWM signal generation circuit, and configured to operably delay the PWM signal for the pulse period, to generate an OFF delay PWM signal; and an OFF logic circuit, which is coupled to the OFF delay circuit, and configured to operably perform a logic operation according to the inverted signal of the PWM signal and the OFF delay PWM signal, to generate the OFF pulse signal according to the level change of the PWM signal in the second direction.

In one preferable embodiment, the PWM signal generation circuit further includes a micro-processor control unit (MCU), which is configured to operably receive a setting signal for setting a target level of the output voltage, wherein the PWM signal generation circuit adjusts the PWM signal further according to the target level.

In the aforementioned embodiment, the controller preferably further includes a blocking circuit including: a blocking comparator, configured to operably generate a blocking comparison signal according to the feedback signal and a threshold voltage which is related to the lower limit voltage; and a blocking logic circuit, which is coupled to the blocking comparator, and configured to operably perform a logic operation on the blocking comparison signal with a blocking control signal generated by the MCU, to generate an enable loading signal; wherein the enable loading signal is for operating a blocking switch, to control whether the output voltage is converted to a load voltage supplied to a load circuit; wherein the blocking logic circuit generates the enable loading signal according to the blocking control signal when the output voltage reaches the lower limit voltage, to determine ON or OFF of the blocking switch, so as to determine whether to block or not to block converting the output voltage to the load voltage.

From another perspective, the present invention provides a controller of a flyback power converter, wherein the flyback power converter includes: a transformer which has a primary winding, configured to operably receive an input voltage, and a secondary winding, configured to operably generate an output voltage; a power switch, which is coupled to the primary winding, and configured to operably control a conduction time of the primary winding; a driver, which is located at a primary side of the transformer, and configured to operably generate a switching signal to control the power switch; a synchronous rectification (SR) switch, which is coupled to the secondary winding, and configured to operably control a conduction time of the secondary winding in correspondence to a nonconductive time of the primary winding; the controller, which is coupled to the SR switch and located at a secondary side of the transformer, and configured to operably control the SR switch and generate an ON pulse signal and an OFF pulse signal in a normal operation mode; and a signal coupler circuit, which is coupled between the controller and the driver, and configured to operably convert the ON pulse signal and the OFF pulse signal to an ON trigger signal and an OFF trigger signal respectively, which are inputted to the driver; wherein when the output voltage reaches or exceeds a lower limit voltage, the flyback power converter operates in the normal operation mode, and in the normal operation mode, the driver generates the switching signal wherein a start conduction time point and an end conduction time point of the primary winding are determined according to the ON trigger signal and the OFF trigger signal respectively. The controller comprises: a synchronous rectification (SR) switch control signal generation circuit, configured to operably generate an SR switch control signal according to a voltage drop sense signal and/or a pulse width modulation (PWM) signal, to control the SR switch; a PWM signal generation circuit, which is coupled to the SR switch control signal generation circuit, and configured to operably generate the PWM signal according to a feedback signal which is related to the output voltage or related to an output current; and a pulse signal generation circuit, configured to operably generate the ON pulse signal according to a level change of the PWM signal in a first direction, and generate the OFF pulse signal according to a level change of the PWM signal in a second direction which is opposite to the first direction.

In one preferable embodiment, the pulse width determination circuit includes: an oscillator, configured to operably generate a clock signal and a ramp signal; a comparator, which is coupled to the oscillator, configured to operably generate a reset signal according to the feedback signal and the ramp signal; and a flip-flop, which is coupled to the comparator, configured to operably generate the PWM signal according to the clock signal and the reset signal.

In one preferable embodiment, the pulse signal generation circuit includes: an ON delay circuit, which is coupled to the PWM signal generation circuit, configured to operably delay an inverted signal of the PWM signal for a pulse period, to generate an ON delay PWM signal; an ON logic circuit, which is coupled to the ON delay circuit, configured to operably perform a logic operation according to the PWM signal and the ON delay PWM signal, to generate the ON pulse signal according to the level change of the PWM signal in the first direction; an OFF delay circuit, which is coupled to the PWM signal generation circuit, configured to operably delay the PWM signal for a pulse period, to generate an OFF delay PWM signal; and an OFF logic circuit, which is coupled to the OFF delay circuit, configured to operably perform a logic operation according to the inverted signal of the PWM signal and the OFF delay PWM signal, to generate the OFF pulse signal according to the level change of the PWM signal in the second direction.

In one preferable embodiment, the PWM signal generation circuit further includes a micro-processor control unit (MCU), which is configured to operably receive a setting signal, wherein the setting signal is for setting a target level of the output voltage, wherein the PWM signal generation circuit adjusts the PWM signal further according to the target level.

In one preferable embodiment, the controller further comprises a blocking circuit including: a blocking comparator, configured to operably generate a blocking comparison signal according to the feedback signal and a threshold voltage which is related to the lower limit voltage; and a blocking logic circuit, which is coupled to the blocking comparator, and configured to operably perform a logic operation on the blocking comparison signal with a blocking control signal generated by the MCU, to generate an enable loading signal; wherein the enable loading signal is for operating a blocking switch, to control whether the output voltage is converted to a load voltage supplied to a load circuit; wherein the blocking logic circuit generates the enable loading signal according to the blocking control signal when the output voltage reaches the lower limit voltage, to determine ON or OFF of the blocking switch, so as to determine whether to block or not to block converting the output voltage to the load voltage.

From another perspective, the present invention provides a driver of a flyback power converter, wherein the flyback power converter includes: a transformer, which has a primary winding, configured to operably receive an input voltage, and a secondary winding, configured to operably generate an output voltage; a power switch, which is coupled to the primary winding, and configured to operably control a conduction time of the primary winding; the driver, which is located at a primary side of the transformer, and configured to operably generate a switching signal to control the power switch; a synchronous rectification (SR) switch, which is coupled to the secondary winding, and configured to operably control a conduction time of the secondary winding corresponding to a nonconductive time of the primary winding; a controller, which is coupled to the SR switch and located at a secondary side of the transformer, and configured to operably control the SR switch and generate an ON pulse signal and an OFF pulse signal in a normal operation mode; and a signal coupler circuit, which is coupled between the controller and the driver, and configured to operably convert the ON pulse signal and the OFF pulse signal to an ON trigger signal and an OFF trigger signal respectively, which are inputted to the driver; wherein when the output voltage reaches or exceeds a lower limit voltage, the flyback power converter operates in the normal operation mode, and in the normal operation mode, the driver generates the switching signal wherein a start conduction time point and an end conduction time point of the primary winding are determined according to the ON trigger signal and the OFF trigger signal respectively. The driver comprises: a low voltage mode ON time control circuit, configured to operably determine the start conduction time point and the end conduction time point of the primary winding in the low voltage operation mode, wherein the low voltage mode ON time control circuit is disabled in the normal operation mode; a normal mode ON time control circuit, which is coupled to the signal coupler circuit, and configured to operably determine the start conduction time point and the end conduction time point of the primary winding in the normal operation mode; and a switching signal generation circuit, which is coupled to the low voltage mode ON time control circuit and the normal mode ON time control circuit, and configured to operably generate the switching signal for controlling the power switch.

In one preferable embodiment, the switching signal generation circuit includes a flip-flop circuit.

In the aforementioned embodiment, the low voltage mode ON time control circuit preferably includes: a sample-and-hold circuit, which is configured to operably sample and hold a signal related to the output voltage, to generate a sample-and-hold signal; an operation mode switching signal generation circuit, configured to operably generate an operation mode switching signal according to the ON trigger signal and/or the OFF trigger signal and the sample-and-hold signal; an oscillator circuit, which is coupled to the operation mode switching signal generation circuit, configured to operably generate a clock signal and a ramp signal according to the operation mode switching signal; a comparator, which is coupled to the oscillator circuit and the operation mode switching signal generation circuit, configured to operably generate a comparison signal according to the ramp signal, the operation mode switching signal, and a low voltage operation mode reference voltage; an OFF logic circuit, which is coupled to the comparator, configured to operably generate a reset signal for being inputted to the flip-flop circuit according to the comparison signal and the OFF trigger signal; and an ON logic circuit, which is coupled to the oscillator circuit, configured to operably generate an enable signal for being inputted to the flip-flop circuit according to the clock signal and the ON trigger signal; wherein when the sample-and-hold signal indicates the output voltage is not lower than the lower limit voltage, or when the ON trigger signal and/or the OFF trigger signal indicates the start conduction time point and/or the end conduction time point of the primary winding, the operation mode switching signal is adjusted to disable the oscillator circuit generating the clock signal and the ramp signal, thus the switching signal is generated not according to the clock signal and/or the ramp signal, and the flyback power converter operates in the normal operation mode; wherein when the sample-and-hold signal indicates the output voltage is lower than the lower limit voltage, and when the ON trigger signal and the OFF trigger signal do not indicate the start conduction time point nor the end conduction time point of the primary winding, the operation mode switching signal is adjusted to enable the oscillator circuit generating the clock signal and the ramp signal, thus the switching signal is generated according to the clock signal and the ramp signal, and the flyback power converter operates in the low voltage operation mode.

In the aforementioned embodiment, the oscillator circuit preferably includes: a ramp signal generation circuit, which includes a capacitor, and configured to operably generate the ramp signal by charging and discharging the capacitor according to the clock signal and an inverted signal of the clock signal; and a comparator-and-logic circuit, which is coupled to the ramp signal generation circuit, and configured to operably compare the ramp signal with a high trip-point voltage, and compare the ramp signal with a low trip-point voltage, and perform a logic operation according to comparison results, to generate the clock signal and the inverted signal of the clock signal.

In the aforementioned embodiment, the operation mode switching signal generation circuit preferably includes a disable circuit, which is coupled to the capacitor, and configured to operably compare the sample-and-hold signal with a threshold voltage, to control a discharge switch to discharge the capacitor to a reference level when the output voltage is not lower than the lower limit voltage, whereby the oscillator circuit is disabled and does not generate the clock signal and the ramp signal, such that the switching signal is generated not according to the clock signal and the ramp signal, and the flyback power converter operates in the normal operation mode.

In one preferable embodiment, the low voltage mode ON time control circuit further includes an analog signal adder amplifier, which is coupled to the oscillator circuit and a current sense circuit, and configured to operably generate a summation amplified voltage signal according to the ramp signal and a current sense signal generated by the current sense circuit; wherein the summation amplified voltage signal is proportional to the current sense signal, or proportional to a sum of the current sense signal and the ramp signal, by a predetermined ratio; wherein the current sense circuit is coupled to the power switch, and configured to operably generate the current sense signal according to a switch current flowing through the power switch.

In one preferable embodiment, the normal mode ON time control circuit includes: a level shifter circuit, which is coupled to the signal coupler circuit, and configured to operably generate an ON trigger level shift signal and an OFF trigger level shift signal according to the ON trigger signal and the OFF trigger signal respectively; and determination circuit, configured to operably generate an enable signal according to an internal supply voltage related to the output voltage; wherein the flip-flop circuit is configured to operably determine the switching signal according to the ON trigger level shift signal and the OFF trigger level shift signal.

In the aforementioned embodiment, the switching signal generation circuit further includes a tri-state buffer, which is coupled to the flip-flop circuit and the determination circuit, wherein the tri-state buffer is enabled when the output voltage is not lower than the lower limit voltage, and the enablement of the tri-state buffer disables the low voltage mode ON time control circuit, such that the switching signal is determined according to the ON trigger signal and the OFF trigger signal.

The objectives, technical details, features, and effects of the present invention will be better understood with regard to the detailed description of the embodiments below.

DESCRIPTION OF THE PREFERRED EMBODIMENTS

The drawings as referred to throughout the description of the present invention are for illustration only, to show the interrelations between the circuits and the signal waveforms, but not drawn according to actual scale.

Figure 1:
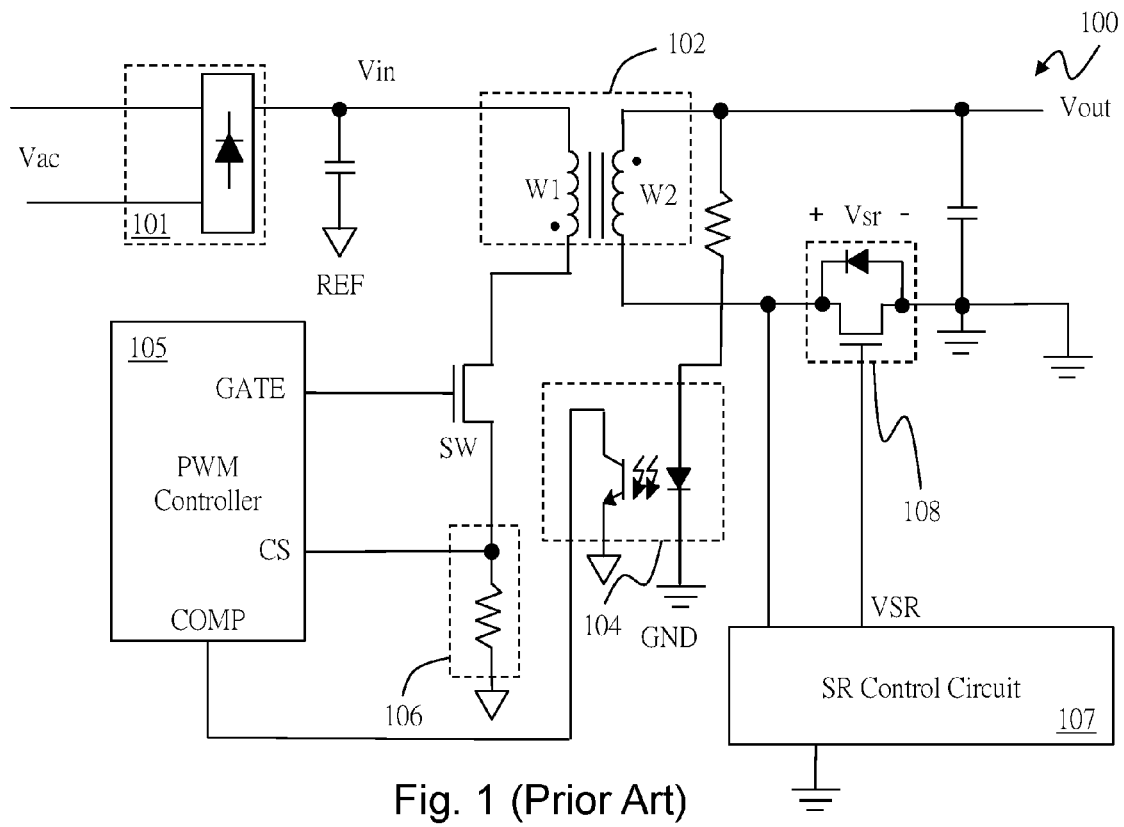
FIG. 1 shows a schematic diagram of a conventional flyback power converter.
Figure 2:
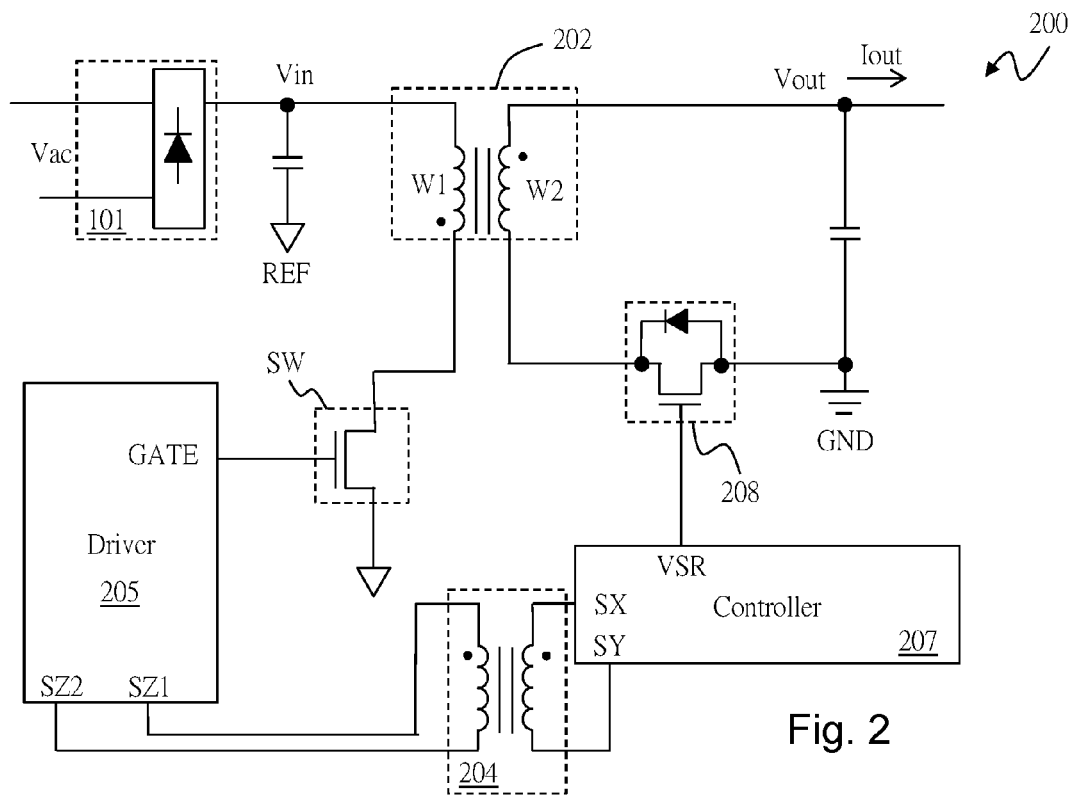
FIG. 2 shows an embodiment of a flyback power converter 200 of the present invention.

FIG. 2 shows an embodiment of a flyback power converter 200 of the present invention. As shown in FIG. 2, the rectifier circuit 101 rectifies the AC voltage Vac to generate an input voltage Vin. The rectifier circuit 101 is for example but not limited to the bridge rectifier circuit. A primary winding W1 of a transformer 202 in the flyback power converter 200 receives the input voltage Vin. A power switch SW controls a conduction time of the primary winding W1 to convert the input voltage Vin to an output voltage Vout at a secondary winding W2 of the transformer 202. The flyback power converter 200 includes the transformer 202, the power switch SW, a signal coupler circuit 204, a driver 205, a controller 207, and a synchronous rectification (SR) switch 208. As shown in FIG. 2, the power switch SW is coupled to the primary winding W1, for controlling the conduction time of the primary winding W1. The driver 205 is located at a primary side of the transformer 202, for generating a switching signal GATE to control the power switch SW. The synchronous rectification (SR) switch 208 is coupled to the secondary winding W2, for controlling a conduction time of the secondary winding W2 in correspondence to an OFF time of the primary winding W1. The controller 207 is at a secondary side of the transformer 202, for controlling the SR switch 208 and generate an ON pulse signal SX and an OFF pulse signal SY in a normal operation mode. The signal coupler circuit 204 is coupled between the controller 207 and the driver 205, for converting the ON pulse signal SX and the OFF pulse signal SY to an ON trigger signal SZ1 and an OFF trigger signal SZ2 respectively. The ON trigger signal SZ1 and the OFF trigger signal SZ2 are inputted to the driver 207. When the output voltage Vout reaches or exceeds a lower limit voltage VOL, the flyback power converter 200 operates in the normal operation mode, and in the normal operation mode, the driver 205 generates the switching signal GATE in which a start conduction time point and an end conduction time point of the primary winding W1 are determined according to the ON trigger signal SZ1 and the OFF trigger signal SZ2 respectively. In the context of the present invention, the primary side of the transformer 202 indicates a side which is the same as the primary winding W1, and circuits at the primary side are electrically connected to a reference level REF in common. The secondary side of the transformer 202 indicates a side which is the same as the secondary winding W2, and circuits at the secondary side are electrically connected to a ground level GND in common.

In this embodiment, the controller 207 for example generates an SR switch control signal VSR according to a feedback signal FB which is related to the output voltage Vout or an output current Iout. The controller 207 also generates a pulse width modulation (PWM) signal according to the SR switch control signal VSR. For example, the ON pulse signal SX is generated according to a rising edge (a level change in a first direction) of the PWM signal, and the OFF pulse signal SY is generated according to a falling edge (a level change in a second direction) of the PWM signal. Thus, the power switch SW controls the ON timing of the primary winding W1 according to ON pulse signal SX, and controls the OFF timing of the primary winding W1 according to OFF pulse signal SY. This embodiment is different from the prior art flyback power converter 100 at least in that, according to the present invention, a signal which controls the primary winding W1 to be conductive and not conductive, for example but not limited to the aforementioned PWM signal, and the SR switch control signal VSR for controlling the SR switch 208, are both generated at the secondary side. On the other hand, in the prior art flyback power converter 100, the PWM signal is generated by the PWM controller 105 at the primary side, but the SR switch control signal for controlling the SR switch 108 is generated by the SR control circuit 107 at the secondary side. That is, according to the present invention, in a normal operation, the PWM signal is generated at the secondary side according to a feedback signal FB related to the output voltage Vout or related to the output current Iout, so the PWM signal and the SR switch control signal are both generated at the secondary side, whereby the short through problem can be easily avoided. On the other hand, in the prior art flyback power converter 100, because the PWM signal and the SR switch control signal are generated at different sides of the transformer 102, i.e., at the primary side and the secondary side respectively, it is not easy to avoid short through, and the primary winding W1 and the secondary winding W2 may be conductive at the same time to damage the flyback power converter 100.

Figure 3:
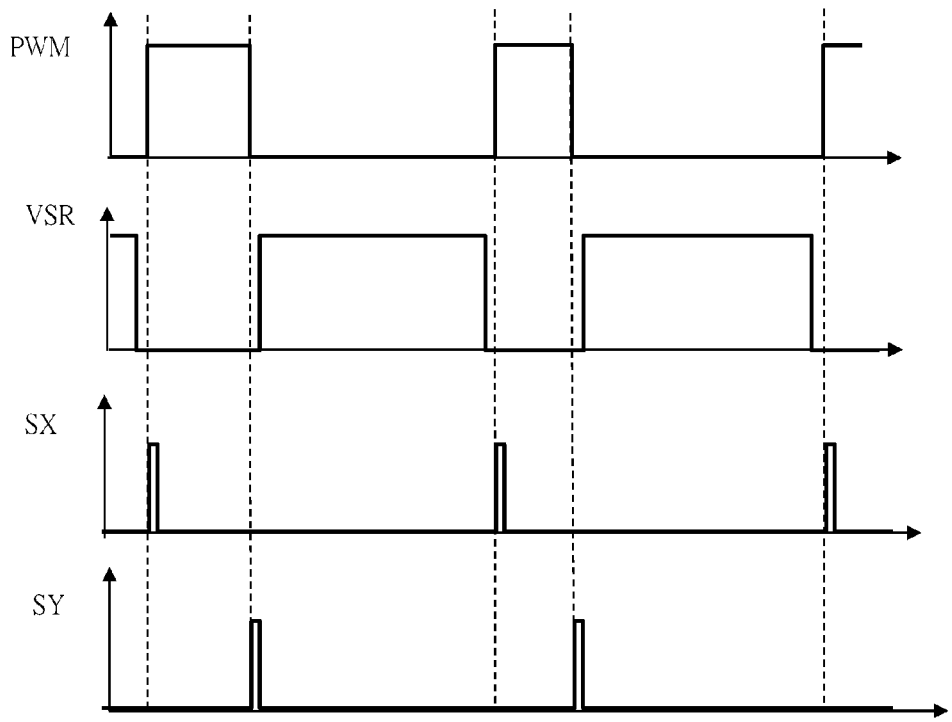
FIG. 3 shows schematic diagrams of signal waveforms of the PWM signal, the SR switch control signal VSR, the ON pulse signal SX, and the OFF pulse signal SY of the present invention.

FIG. 3 shows a schematic diagram of signal waveforms of the PWM signal, the SR switch control signal VSR, the ON pulse signal SX, and the OFF pulse signal SY. As shown in the figure, the controller 207 generates the PWM signal according to the output voltage Vout or the output current Iout, so as to generate the SR switch control signal VSR, and to generate the ON pulse signal SX according to the rising edge of the PWM signal, and the OFF pulse signal SY according to the falling edge of the PWM signal.

Figure 5:
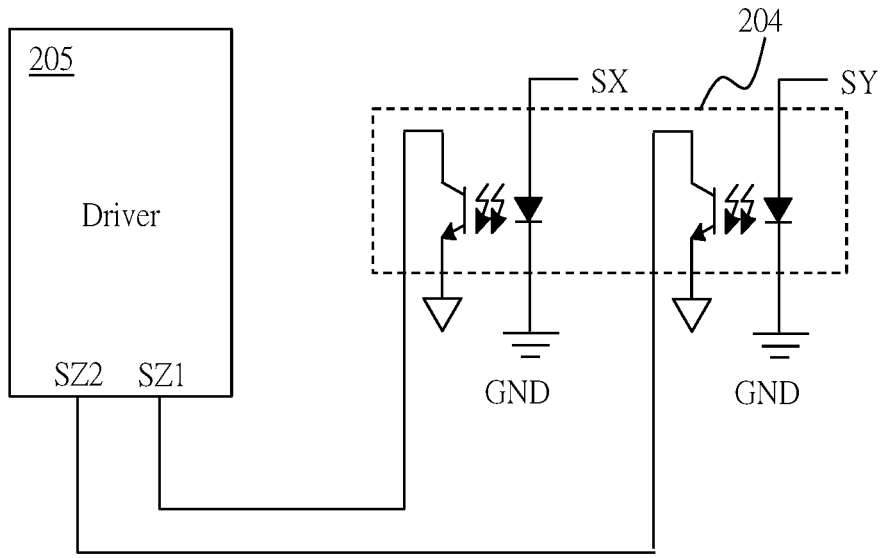
FIG. 5 shows another embodiment of the signal coupler circuit 204 of the present invention.

In one embodiment, both pulse widths of the ON pulse signal SX and the OFF pulse signal SY are preferably shorter than 200 nanosecond. In this case, the signal coupler circuit 204 may be implemented by a pulse transformer as shown in FIG. 2, which has a relatively smaller size compared to a typical transformer; or, the signal coupler circuit 204 may alternatively be implemented by a pulse optocoupler as shown in FIG. 5.

In one preferable embodiment of the present invention, a pulse width or a duty ratio of the PWM signal is determined according to the feedback signal FB which is related to the output voltage Vout or related to the output current Iout, and a time point of turning OFF the SR switch 208 may be determined according to a current flowing through the secondary winding W2 and/or the feedback signal FB, or according to an earlier one of the current flowing through the secondary winding W2 and the feedback signal FB. For example, referring to FIG. 3, wherein an example is given by defining the high level as ON and the low level as OFF, after the OFF pulse signal SY is generated according to the falling edge of the PWM signal, the SR switch control signal VSR turns ON the SR switch 208; and when the current flowing through the secondary winding W2 is close to a zero current, the SR switch control signal VSR turns OFF the SR switch 208. Or, the SR switch control signal VSR turns OFF the SR switch 208 according to a previous rising edge of the PWM signal, such that the SR switch 208 is turned OFF before the next rising edge of the PWM signal.

The current flowing through the secondary winding W2 can be determined according to a voltage drop of the SR switch 208, or equivalently, a voltage of a node at the left side of the SR switch 208 in FIG. 2. For example, in one embodiment, when an absolute level of the voltage drop of the SR switch 208 decreases to a predetermined zero current level, it indicates that the current flowing through the secondary winding W2 is close to zero current, because the voltage drop of the SR switch 208 is very low, so the SR switch control signal VSR is changed from the high level to the low level to turn OFF the SR switch 208. Or in another embodiment, the SR switch control signal VSR is changed from the high level to the low level to turn OFF the SR switch 208 before the rising edge of the PWM signal (because the pulse width or duty ratio of the PWM signal is known). Or in another embodiment, the SR switch control signal VSR is changed from the high level to the low level to turn OFF the SR switch 208, according to an earlier one of the above two, i.e., the earlier one of the occurrence of the voltage drop of the SR switch 208 decreasing to the predetermined zero current level, and the occurrence of a predetermined time prior to the rising edge of the PWM signal.

By the aforementioned mechanism, the time points of turning ON and OFF the SR switch 208 can be properly controlled, and by delivering the ON pulse signal SX and the OFF pulse signal SY to the primary side, the time points of turning ON and OFF the power switch SW are also properly controlled; thus the short through problem can be avoided according to the present invention. The aforementioned embodiments are given as illustrative examples, not for limiting the scope of the present invention. In the above embodiments, the present invention provides an advantage of zero current switching, but this is only preferred but not a necessary. The present invention also can determine the time points of turning ON and OFF the SR switch 206 and the power switch SW by other methods, as long as such methods fall in the spirit of the present invention, which is to determine the time points of turning ON and OFF the power switch SW by the controller 207 at the secondary side, and deliver related information to the primary side by the ON pulse signal and the OFF pulse signal SY.

Figure 4:
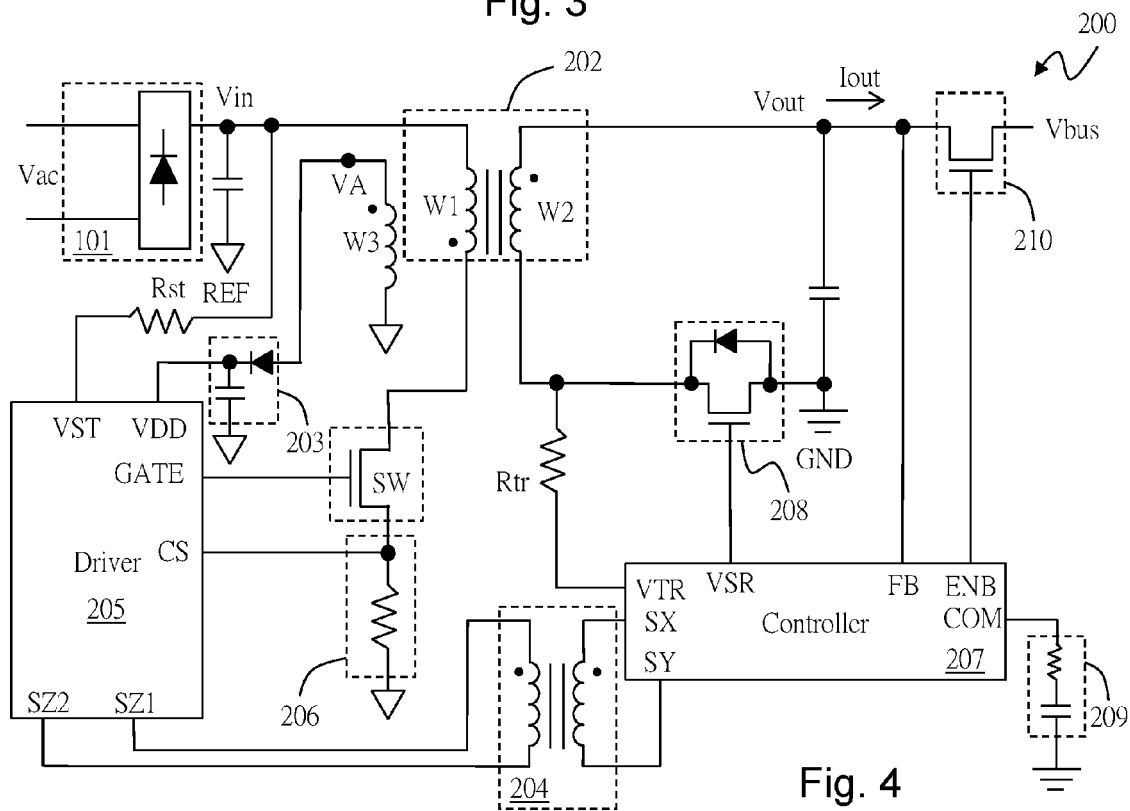
FIG. 4 shows a more specific embodiment of a flyback power converter 200 of the present invention.

FIG. 4 shows a more specific embodiment of the flyback power converter 200 shown in FIG. 2 of the present invention. Compared to the embodiment shown in FIG. 2, in this embodiment, the transformer 202 of the flyback power converter 200 further includes an auxiliary winding W3, which generates an auxiliary voltage VA according to the output voltage Vout; and the flyback power converter 200 further includes a rectifier filter circuit 203, which generates an internal supply voltage VDD for supplying electrical power to the driver 205 according to the auxiliary voltage VA; besides, in this embodiment, the flyback power converter 200 further includes a start-up resistor Rst, which is for generating a strat-up voltage VST according to the input voltage Vin, wherein the start-up voltage VST is provided to the driver 205 when the input voltage Vin is lower than the lower limit voltage VOL.

In addition, in this embodiment, the flyback power converter 200 further includes a current sense circuit 206 which is coupled to the power switch SW, for generating a current sense signal CS according to a switch current flowing through the power switch SW. Besides, in this embodiment, the flyback power converter 200 further includes an RC circuit 209, which is coupled to the controller 207. The RC circuit 209 includes a resistor and a capacitor connected in series, for generating a compensation signal COM in the feedback control loop for generating the PWM signal according to the feedback signal FB; the compensation signal COM is generated in the controller 207. Besides, in this embodiment, the flyback power converter 200 further includes a voltage drop sense circuit, which includes for example but not limited to a resistor Rtr as shown in the figure; the resistor Rtr is coupled between the secondary winding W2 and the controller 207, for generating the voltage drop sense signal VTR according to a voltage drop across the SR switch 208.

In addition, in this embodiment, the flyback power converter 200 further includes a blocking switch 210, which is coupled to the controller 207, and is controlled by an enable loading signal ENB. The controller 207 generates the enable loading signal ENB to control the blocking switch 210, i.e., to block or not to block converting the output voltage Vout to a load voltage Vbus, wherein the load voltage Vbus is for supplying electrical power to a load circuit (not shown). For example, when the output voltage Vout is lower than the lower limit voltage VOL, the enable loading signal ENB turns OFF the blocking switch 210 to block converting the output voltage Vout to the load voltage Vbus, and thus the flyback power converter 200 does not supply electrical power to the load circuit. When the output voltage Vout is not lower than the lower limit voltage VOL, the enable loading signal ENB turns ON the blocking switch 210 to allow converting the output voltage Vout to the load voltage Vbus, and thus the flyback power converter 200 supplies electrical power to the load circuit. This mechanism is to ensure that the flyback power converter 200 supplies electrical power to the load circuit after the output voltage Vout has reached the lower limit voltage VOL, such that the output voltage Vout will not be unable or too late to reach the lower limit voltage VOL because of the load circuit.

FIG. 5 shows another embodiment of the signal coupler circuit 204 of the flyback power converter 200 according to the present invention. As shown in the figure, the signal coupler circuit 204 includes a pulse opto-coupler. The signal coupler circuit 204 is coupled between the controller 207 and the driver 205, for converting the ON pulse signal SX and the OFF pulse signal SY to the ON trigger signal SZ1 and the OFF trigger signal SZ2 respectively, wherein the ON trigger signal SZ1 and the OFF trigger signal SZ2 are inputted to the driver 205. Note that the input signals and output signals of the pulse transformer and the pulse opto-coupler are signals in a pulse form.

Figure 6:
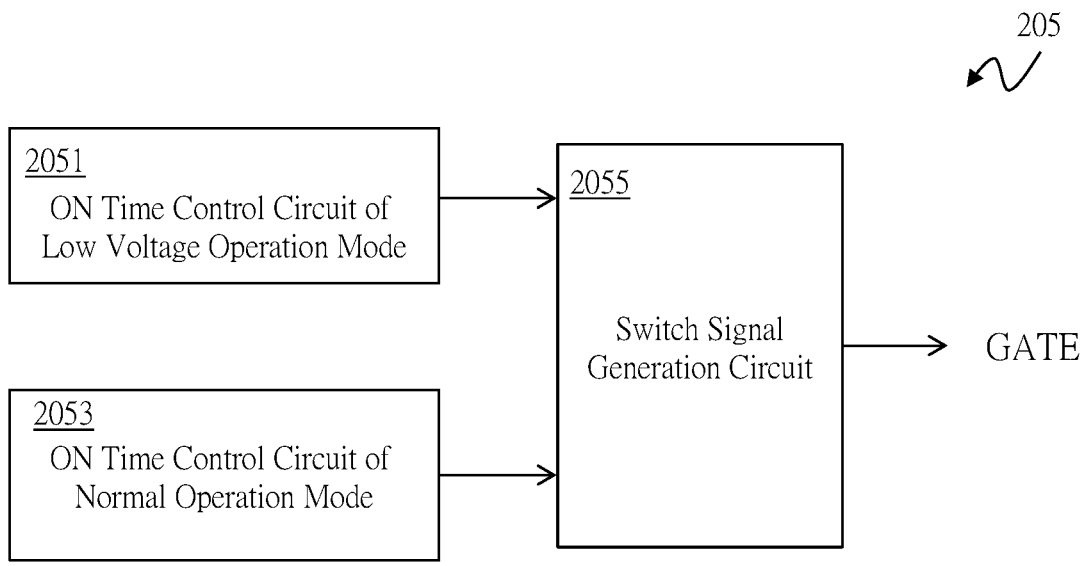
FIG. 6 shows an embodiment of a driver 205 of the present invention.

FIG. 6 shows an embodiment of the driver 205 which is for example used in the flyback power converter 200 of FIG. 2 according to the present invention. The flyback power converter 200 can operate in a normal operation mode and a low voltage operation mode. When the output voltage Vout does not reach the lower limit voltage VOL, or when the ON pulse signal SX and/or the OFF pulse signal SY do not indicate that the flyback power converter 200 is operating in the normal operation mode, the flyback power converter 200 operates in the low voltage operation mode, and when the output voltage Vout reaches the lower limit voltage VOL, the flyback power converter 200 operates in the normal operation mode. The driver 205 includes: a low voltage mode ON time control circuit 2051, for determining the start conduction time point and the end conduction time point of the primary winding W1 in the low voltage operation mode, and is disabled in the normal operation mode; a normal mode ON time control circuit 2053, which is coupled to the signal coupler circuit 204, for determining the start conduction time point and the end conduction time point of the primary winding W1 in the normal operation mode; and a switching signal generation circuit 2055, which is coupled to the low voltage mode ON time control circuit 2051 and the normal mode ON time control circuit 2053, for generating the switching signal GATE for controlling the power switch SW.

The low voltage mode ON time control circuit 2051 can be disabled in the normal operation mode by, for example but not limited to, a disable signal. In other embodiments, the low voltage mode ON time control circuit 2051 can be disabled in the normal operation mode by other mechanisms of the circuitry. For example, the low voltage operation mode ON time control circuit 2051 may be considered disabled when a frequency of the switching signal GATE, which is determined by the low voltage mode ON time control circuit 2051, is far lower than a frequency of the switching signal GATE, which is determined by the normal mode ON time control circuit 2053 in the normal operation mode, such that the output signal of the low voltage mode ON time control circuit 2051 is ignorable.

Figure 7:
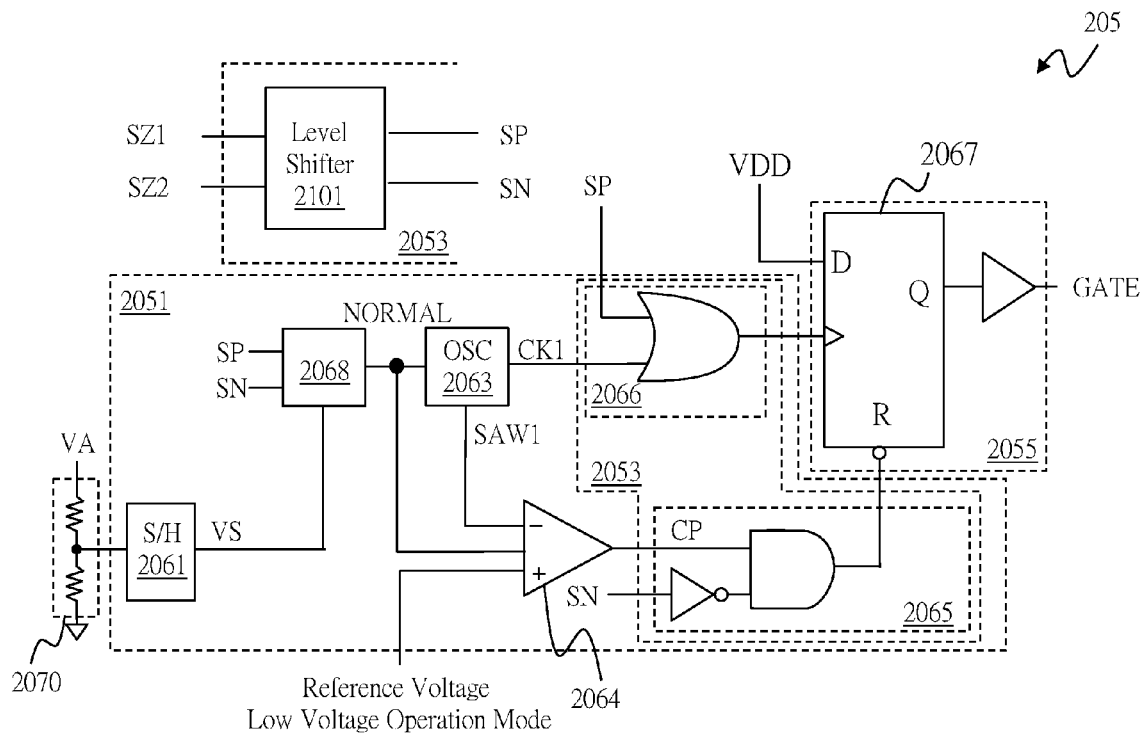
FIG. 7 show a more specific embodiment of a driver 205 of the present invention.

FIG. 7 show a more specific embodiment of the driver 205 of FIG. 6 according to the present invention. In this embodiment, the driver 205 includes the low voltage mode ON time control circuit 2051, the normal mode ON time control circuit 2053, and the switching signal generation circuit 2055. As shown in the figure, the low voltage mode ON time control circuit 2051 includes: a sample-and-hold circuit 2061, an oscillator circuit 2063, a comparator 2064, an OFF logic circuit 2065, an ON logic circuit 2066, and an operation mode switching signal generation circuit 2068. The normal mode ON time control circuit 2053 includes the OFF logic circuit 2065 and the ON logic circuit 2066, which are also included as a part of the low voltage mode ON time control circuit 2051. The normal mode ON time control circuit 2053 for example further includes a level shifter circuit 2101, which is coupled to the signal coupler circuit 204, for generating the ON trigger level shift signal SP and the OFF trigger level shift signal SN according to the ON trigger signal SZ1 and the OFF trigger signal SZ2 respectively. The switching signal generation circuit 2055 includes for example but not limited to the flip-flop circuit 2067. When the output voltage Vout is not lower than the lower limit voltage VOL, the normal mode ON time control circuit 2053 enables a flip-flop circuit 2067 according to an ON trigger level shift signal SP, and resets the flip-flop circuit 2067 according to an OFF trigger level shift signal SN, so as to generate the switching signal GATE according to the ON trigger level shift signal SP and the OFF trigger level shift signal SN. The ON trigger level shift signal SP and the OFF trigger level shift signal SN are generated by a level shifter circuit 2101 according to the ON trigger signal SZ1 and the OFF trigger signal SZ2 respectively, as mentioned above.

Still referring to FIG. 7, the sample-and-hold circuit 2061 samples and holds a signal related to the output voltage Vout, to generate a sample-and-hold signal VS. Referring to FIG. 4 as well, the transformer 202 for example further includes the auxiliary winding W3, which generates the auxiliary voltage VA according to the output voltage Vout. A voltage divider circuit 2070 receives the auxiliary voltage VA to generate the aforementioned signal which is related to the output voltage Vout by obtaining a divided voltage of the auxiliary voltage VA, and provides the signal related to the output voltage Vout to the sample-and-hold circuit 2061. An operation mode switching signal generation circuit 2068 generates an operation mode switching signal NORMAL according to the ON trigger signal SP and/or the OFF trigger signal SN and the sample-and-hold signal VS, to decide the operation mode. The oscillator circuit 2063, which is coupled to the operation mode switching signal generation circuit 2068, generates a clock signal CK1 and a ramp signal SAW1 according to the operation mode switching signal NORMAL. The comparator 2064 which is coupled to the oscillator circuit 2063 and the operation mode switching signal generation circuit 2068, generates a comparison signal CP according to the ramp signal SAW1, the operation mode switching signal NORMAL, and a low voltage operation mode reference voltage.

Note that, the method of generating the switching signal GATE in the low voltage mode shown in FIG. 7 is only for illustrative purpose, not for limiting the scope of the present invention. Those skilled in this art can readily conceive variations and modifications within the spirit of the present invention. The goal is to increase the output voltage Vout when the output voltage Vout has not yet reached the lower limit voltage VOL, by any mechanism. For example, the mechanism may be a close loop control mechanism, such as a current mode control mechanism, a voltage mode control mechanism, a constant ON time control mechanism, or a hysteresis mode control mechanism, etc., which increases the output voltage Vout according to a reference voltage. For another example, the mechanism may be an open loop control mechanism, such as, turning OFF the power switch SW when the current sense signal CS reaches a predetermined level, or, turning OFF the power switch SW when the power switch SW has been conductive for a predetermined period of time, etc. There are various methods of generating the switching signal GATE in the low voltage mode, which can be conceived by those skilled in the art under the spirit of the present invention.

The OFF logic circuit 2065 is coupled to the comparator 2064, for generating a reset signal R according to the comparison signal CP and the OFF trigger level shift signal SN; the reset signal is inputted to the flip-flop circuit 2067. For example, the OFF logic circuit 2065 includes for example but not limited to a NOT logic gate and an AND gate as shown in the figure, to perform a NOT logic operation on the OFF trigger level shift signal SN, and perform an AND logic operation on a result of the NOT logic gate with the comparison signal CP, to generate the reset signal R. The ON logic circuit 2066 is coupled to the oscillator circuit 2063, for generating an enable signal according to the clock signal CK1 and the ON trigger level shift signal SP; the enable signal is inputted to the flip-flop circuit 2067 as a clock signal. For example, the ON logic circuit 2066 includes for example but not limited to an OR logic gate as shown in the figure, to perform an OR logic operation on the clock signal CK1 with the ON trigger level shift signal SP, to generate the enable signal as the clock signal to be inputted to the flip-flop circuit 2067. When the sample-and-hold signal VS indicates that the output voltage Vout is not lower than the lower limit voltage VOL, or when the ON trigger signal SZ1 indicates the start conduction time point of the primary winding and/or the OFF trigger signal SZ2 indicates the end conduction time point of the primary winding, the operation mode switching signal NORMAL disables the oscillator circuit 2063 such that it does not generate the clock signal CK1 and the ramp signal SAW1, whereby the switching signal GATE is generated not according to the clock signal CK1 and/or the ramp signal SAW1, and the flyback power converter 200 operates in the normal operation mode. When the sample-and-hold signal VS indicates that the output voltage Vout is lower than the lower limit voltage VOL, and when the ON trigger signal SZ1 and the OFF trigger signal SZ2 do not indicate the start conduction time point nor the end conduction time point of the primary winding W1, the operation mode switching signal NORMAL enables the oscillator circuit 2063 to generate the clock signal CK1 and the ramp signal SAW1, whereby the switching signal GATE is generated according to the clock signal CK1 and the ramp signal SAW1, and the flyback power converter 200 operates in the low voltage operation mode.

In one embodiment, an input terminal of the flip-flop circuit 2067 is coupled to the rectifier filter circuit 203 (referring to FIG. 4), to receive the internal supply voltage VDD as an input signal. The rectifier filter circuit 203 is for generating the internal supply voltage VDD according to the auxiliary voltage VA, to supply electrical power to the driver 205. The ON trigger level shift signal SP and the OFF trigger level shift signal SN are respectively obtained by adjusting the levels of the ON trigger signal SZ1 and the OFF trigger signal SZ2 to proper levels for operation in the driver 205.

The operation mode switching signal generation circuit 2068 for example can detect whether there is an existence of the ON trigger level shift signal SP and/or the OFF trigger level shift signal SN, and whether the output voltage Vout is higher than the lower limit voltage VOL, to decide the operation mode. When the ON trigger level shift signal SP and/or the OFF trigger level shift signal SN occur, or when the output voltage Vout is higher than the lower limit voltage VOL, the operation mode switching signal generation circuit 2068 generates the operation mode switching signal NORMAL to disable the oscillator circuit 2063 and the comparator 2064, so that the ON logic circuit 2066 enables and the OFF logic circuit 2065 resets the flip-flop circuit 2067 according to the ON trigger level shift signal SP and the OFF trigger level shift signal SN respectively, whereby the switching signal GATE is generated according to the ON trigger level shift signal SP and the OFF trigger level shift signal SN, not according to the clock signal CK1 and the comparison signal CP.

Figure 8:
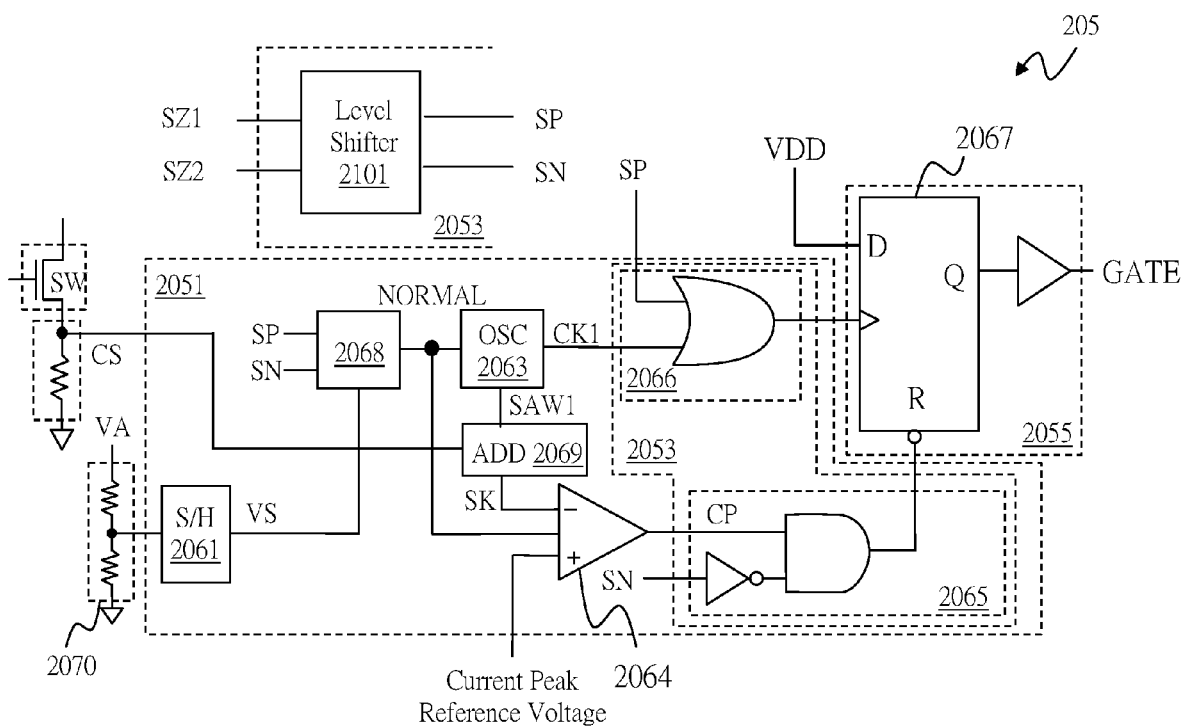
FIG. 8 shows another embodiment of the driver 205 of the present invention.

FIG. 8 shows another more specific embodiment of the driver 205 according to the present invention. This embodiment is different from the embodiment of the driver 205 shown in FIG. 7 in that, in this embodiment, the low voltage mode ON time control circuit 2051 further includes an analog signal adder amplifier 2069, which is coupled to the oscillator circuit 2063 and a current sense circuit 206, for generating a summation amplified voltage signal SK according to the ramp signal SAW1 and a current sense signal CS. The summation amplified voltage signal SK is proportional to the current sense signal CS, or a sum of the current sense signal CS and the ramp signal SAW1, with a predetermined ratio. The current sense circuit 206 is coupled to the power switch SW, for generating the current sense signal CS according to a switch current flowing through the power switch SW.

Figure 9:
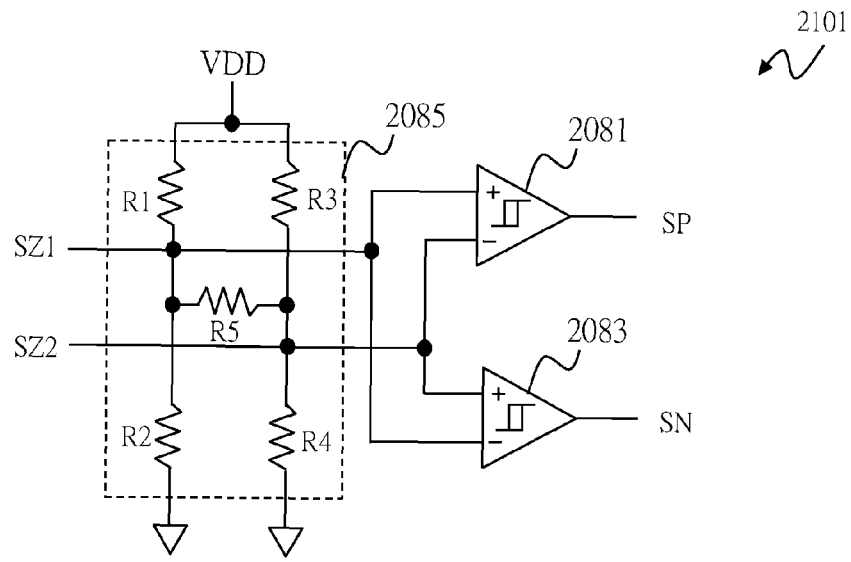
FIG. 9 shows an embodiment of a level shifter circuit 2101 of the present invention.

FIG. 9 shows an embodiment of the aforementioned level shifter circuit 2101. As shown in the figure, the level shifter circuit 2101 includes a comparator 2081, a comparator 2083, and a level shifter 2085. The level shifter 2085 receives the ON trigger signal SZ1 and the OFF trigger signal SZ2, and shifts the levels of the ON trigger signal SZ1 and the OFF trigger signal SZ2 by resistors R1, R2, R3, and R4, such that the ON trigger level shift signal SP and the OFF trigger level shift signal SN have the proper levels for operation in the driver 205. In general, internal electronics devices of the driver 205 operate in a range of digital signal levels, so the level shifter circuit 2101 can adjusts the levels of the ON trigger signal SZ1 and the OFF trigger signal SZ2 to such a range. The resistor R5 provides a relatively lower input impedance for the level shifter circuit 2101, compared to the resistors R1, R2, R3, and R4. The comparator 2081 compares the ON trigger signal SZ1 with the OFF trigger signal SZ2. For example, when the ON trigger signal SZ1 is higher than the OFF trigger signal SZ2 for a delay threshold, the comparator 2081 generates the ON trigger level shift signal SP. The comparator 2083 compares the OFF trigger signal SZ2 with the ON trigger signal SZ1. For example, when the OFF trigger signal SZ2 is higher than the ON trigger signal SZ1 for another delay threshold, the comparator 2083 generates the OFF trigger level shift signal SN.

Figure 10:
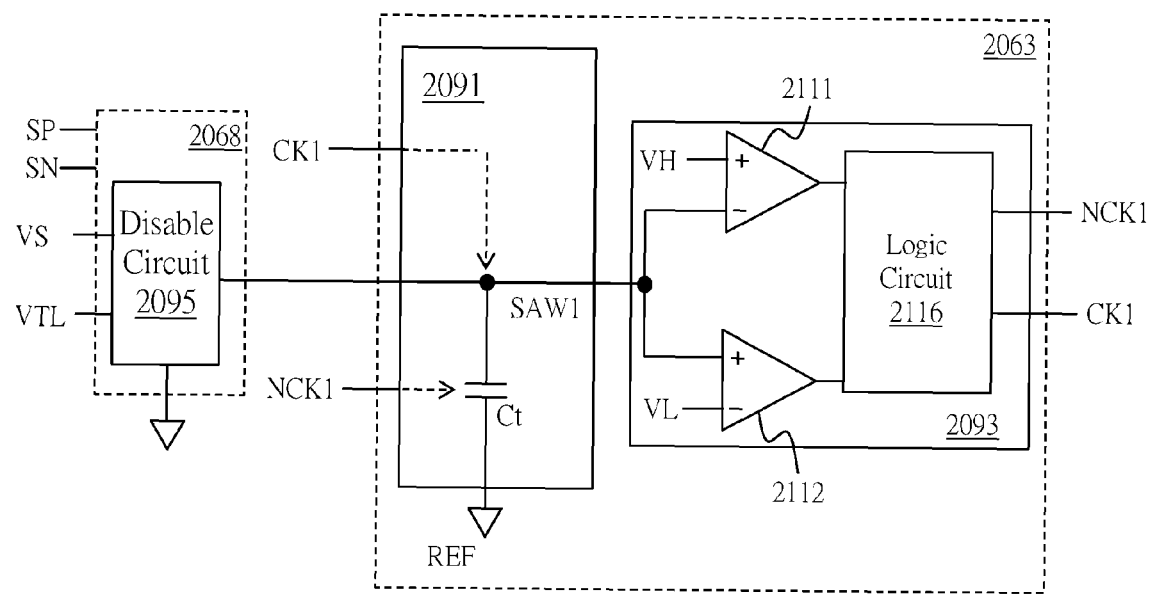
FIG. 10 shows an embodiment of an oscillator circuit 2063 in the present invention.

FIG. 10 shows an embodiment of the aforementioned oscillator circuit 2063 in the present invention. As shown in the figure, the oscillator circuit 2063 includes: a ramp signal generation circuit 2091 and a comparator-and-logic circuit 2093 (including comparators 2111-2112 and a logic circuit 2116). The ramp signal generation circuit 2091 includes a capacitor Ct, for generating the ramp signal SAW1 by charging and discharging the capacitor Ct according to the clock signal CK1 and its inverted signal NCK1. The comparator-and-logic circuit 2093 is coupled to the ramp signal generation circuit 2091, for comparing the ramp signal SAW1 with a high trip-point voltage VH and comparing the ramp signal SAW1 with a low trip-point voltage VL separately, and performing a logic operation according to comparison results by the logic circuit 2116, to generate the clock signal CK1 and its inverted signal NCK1. The operation mode switching signal generation circuit 2068 for example includes a disable circuit 2095, which is coupled to the capacitor Ct, for comparing the sample-and-hold signal VS with a threshold voltage VTL, to control a discharge switch (will be described later) to discharge the capacitor Ct to a reference level REF when the output voltage Vout is not lower than the lower limit voltage VOL, whereby the oscillator circuit 2063 is disabled and cannot generate the clock signal CK1 and the ramp signal SAW1. Thus, the switching signal GATE is generated not according to the clock signal CK1 and/or the ramp signal SAW1, and the flyback power converter 200 operates in the normal operation mode.

Figure 11:
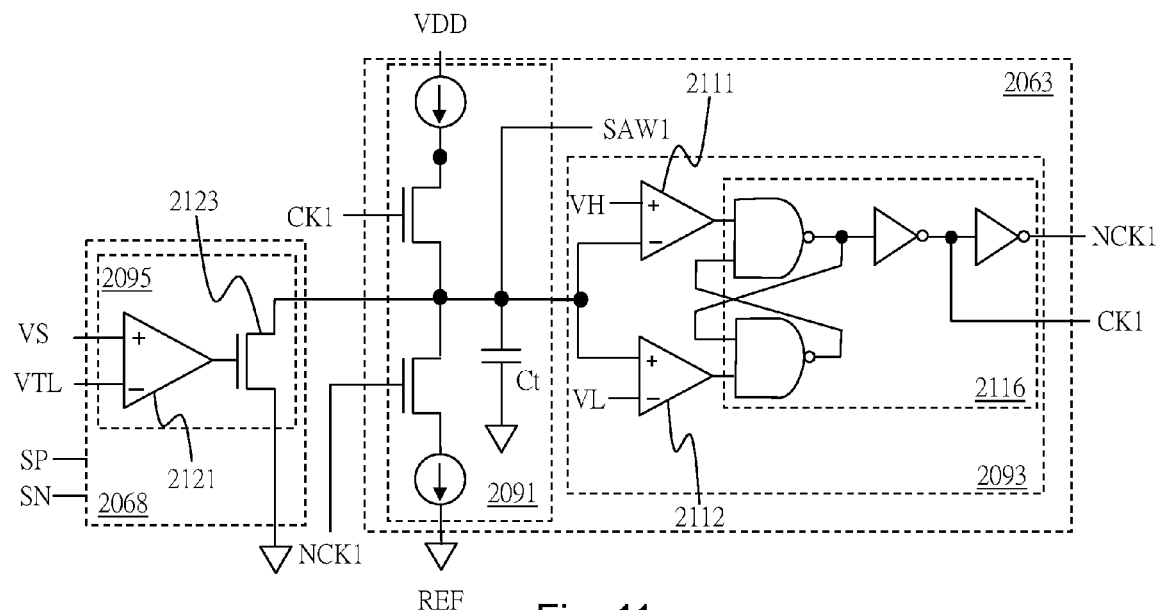
FIG. 11 shows a more specific embodiment of the oscillator circuit 2063 of the present invention.

FIG. 11 shows a more specific embodiment of the aforementioned oscillator circuit 2063 of the present invention. As shown in the figure, the oscillator circuit 2063 includes: the ramp signal generation circuit 2091 and the comparator-and-logic circuit 2093. The ramp signal generation circuit 2091 includes a capacitor Ct, for generating the ramp signal SAW1 by charging and discharging capacitor Ct according to the clock signal CK1 and its inverted signal NCK1. As shown in the figure, the clock signal CK1 and its inverted signal NCK1 control different switches which are connected through charging and discharging current sources to the internal supply voltage VDD and the reference level REF respectively. The switches are turned ON and OFF according to the clock signal CK1 and its inverted signal NCK1, to charge and discharge the capacitor Ct, for generating the ramp signal SAW1.

Still referring to FIG. 11, The comparator-and-logic circuit 2093 is coupled to the ramp signal generation circuit 2091, for comparing the ramp signal SAW1 with the high trip-point voltage VH and comparing the ramp signal SAW1 with the low trip-point voltage VL respectively, and performing a logic operation according to comparison results, to generate the clock signal CK1 and its inverted signal NCK1. As shown in the figure, two NAND logic gates and two NOT logic gates perform logic operations of the aforementioned comparison results, to generate the clock signal CK1 and its inverted signal NCK1. The operation mode switching signal generation circuit 2068 for example includes a disable circuit 2095, which is coupled to the capacitor Ct, for comparing the sample-and-hold signal VS with the threshold voltage VTL, to control a discharge switch 2123 to discharge the capacitor Ct to the reference level REF when the output voltage Vout is not lower than the lower limit voltage VOL; thus, the oscillator circuit 2063 is disabled and cannot generate the clock signal CK1 and the ramp signal SAW1, so that the switching signal GATE is generated not according to the clock signal CK1 and/or the ramp signal SAW1, and the flyback power converter 200 operates in the normal operation mode. The disable circuit 2095 includes a comparator 2121 and a switch 2123. The comparator 2121 compares the sample-and-hold signal VS with the threshold voltage VTL, and the switch 2123 is controlled according to the comparison result, to determine whether or not to discharge the capacitor Ct.

Figure 12A:
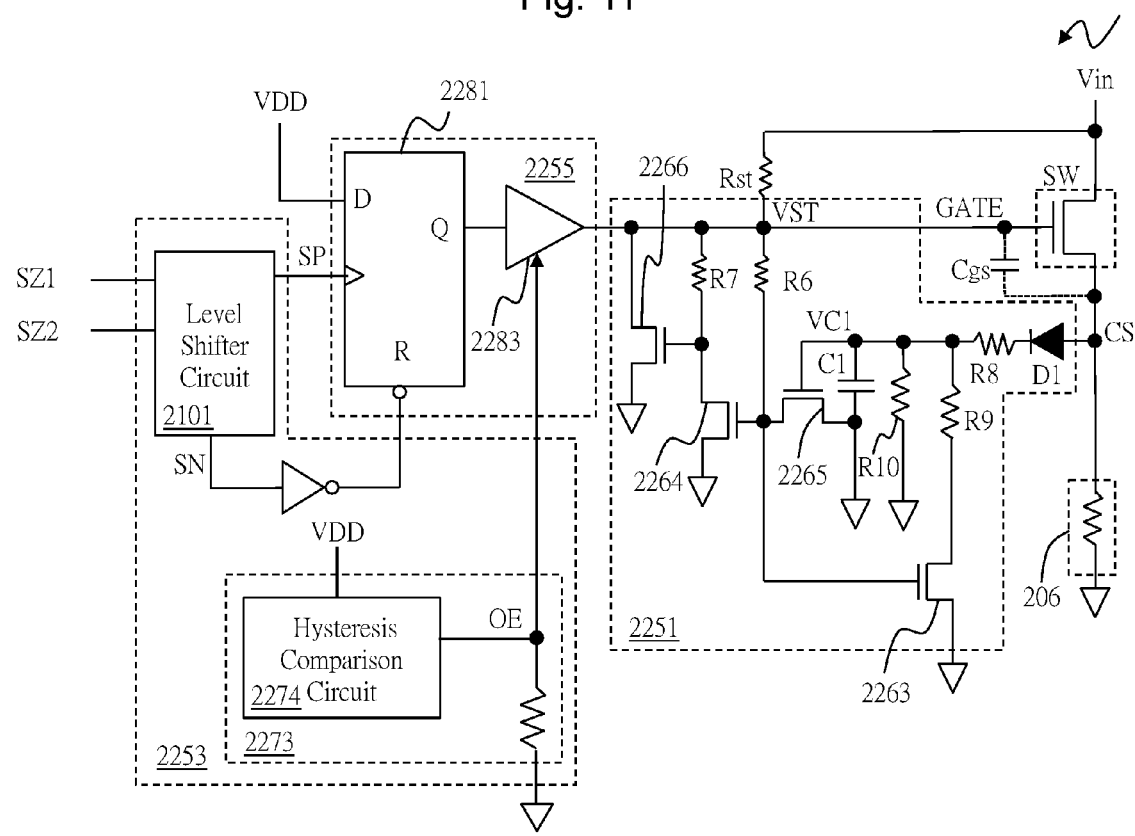
FIGS. 12A and 12B show another more specific embodiment of the driver 205 of the present invention.
Figure 12B:
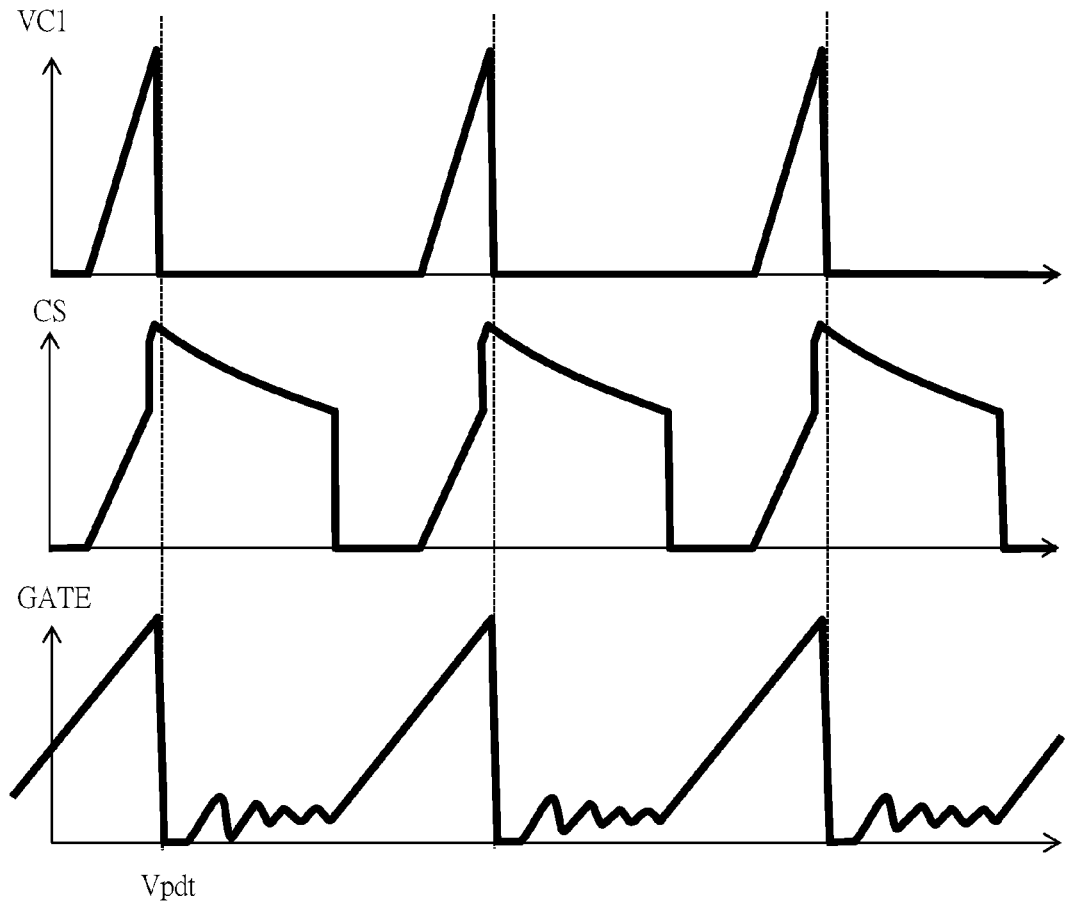

FIGS. 12A and 12B show another more specific embodiment of the driver 205 of the present invention. As shown in FIG. 12A, in this embodiment, the driver 205 includes a low voltage mode ON time control circuit 2251, a normal mode ON time control circuit 2253, and a switching signal generation circuit 2255. As shown in FIG. 12A and referring FIG. 4 as well, the flyback power converter 200 further includes the start-up resistor Rst, which is for generating the strat-up voltage VST according to the input voltage Vin when the input voltage Vin is lower than the lower limit voltage VOL. The start-up voltage VST is provided to the driver 205 and received by the low voltage mode ON time control circuit 2251. When an enable signal OE which is generated according to the internal supply voltage VDD, which is related to the output voltage Vout, does not enable the flyback power converter 200 to operate in the normal operation mode, or when the internal supply voltage VDD is not sufficient for the flyback power converter 200 to operate in the normal operation mode, the flyback power converter 200 operate in the low voltage operation mode. In this embodiment, when the enable signal OE which is generated according to the internal supply voltage VDD disables a tri-state buffer 2283 of the switching signal generation circuit 2255 in the driver 205, the flyback power converter 200 operates in the low voltage operation mode; the tri-state buffer 2283 for example can be disabled by setting it to a high impedance.

Still referring FIG. 12A, the start-up voltage VST charges the parasitic capacitor Cgs of the power switch SW via the aforementioned start-up resistor Rst. When the start-up voltage VST increases, i.e., a charged voltage of the parasitic capacitor Cgs increases, the switching signal GATE increases to turn ON the power switch SW. When the power switch SW is turned ON, the primary winding W1 becomes conductive, and the switch current flowing through the primary winding W1 (and the current sense circuit 206) increases. The current sense circuit 206 is coupled to the power switch SW, for generating the current sense signal CS according to the switch current flowing through the power switch SW. When the switching signal GATE increases to a threshold level, the switches 2263 and 2264 are turned ON as well. When the current sense signal CS exceeds a forward voltage of a diode D1, a capacitor C1 starts to be charged, whereby a voltage VC1 increases. When the voltage VC1 reaches a predetermined voltage Vpdt, a switch 2265 is turned ON, causing the switches 2263 and 2264 to be turned OFF, whereby a switch 2266 is turned ON, to decrease the switching signal GATE. The above process of increasing/decreasing the switching signal GATE (to thereby control the power switch SW) will continue until the enable signal OE enables the tri-state buffer 2283, i.e., until the flyback power converter 200 operates in the normal operation mode. In short, when the tri-state buffer 2283 is disabled, the power switch SW is turned ON and OFF according to the aforementioned mechanism, whereby the output voltage Vout increases until the tri-state buffer 2283 is enabled to change the operation mode of the flyback power converter 200 from the low voltage operation mode to the normal operation mode.

FIG. 12B shows a schematic diagram of signal waveforms of the voltage VC1, the current sense signal CS, and the switching signal GATE. The signal waveforms as shown in FIG. 12B can be generated by selecting proper resistances of the aforementioned resistors. In one embodiment, the start-up resistor Rst has a resistance 1 M ohm; the resistor R6 has a resistance 0.5 M ohm; the resistor R7 has a resistance 0.5 M ohm; the capacitor C1 has a capacitance 10 pF; the resistor R8 has a resistance 1 k ohm; the resistor R9 has a resistance 2 k ohm; the resistor R10 has a resistance 2 M ohm; and the current sense circuit 206 has a resistance 1 ohm. In the above example, the switch 2266 preferably has a threshold voltage higher than a threshold voltage of the switch 2264; and when the switch 2266 is turned ON, a current flowing through the switch 2266 is higher than 5 mA, when a voltage drop across the parasitic capacitor Cgs is equal to a threshold voltage of the power switch SW plus 0.3V.

Still referring to FIG. 12A, the normal mode ON time control circuit 2253 includes the level shifter circuit 2101 and a determination circuit 2273. The level shifter circuit 2101 is coupled to the signal coupler circuit 204 as described in the above, for generating the ON trigger level shift signal SP and the OFF trigger level shift signal SN according to the ON trigger signal SZ1 and the OFF trigger signal SZ2 respectively. As shown in the figure, the ON trigger level shift signal SP for example is inputted to a clock input of a flip-flop 2281 in the switching signal generation circuit 2255, and the OFF trigger level shift signal SN is inputted, after a NOT logic operation, to a reset input of the flip-flop 2281 in the switching signal generation circuit 2255. The determination circuit 2273 is coupled to the tri-state buffer 2283, for generating the enable signal OE according to the internal supply voltage VDD related to the output voltage Vout, wherein the enable signal OE enables the tri-state buffer 2283 when the output voltage Vout is not lower than the lower limit voltage VOL. The flip-flop circuit 2281 determines the switching signal GATE according to the ON trigger level shift signal SP and the OFF trigger level shift signal SN.

Figure 13:
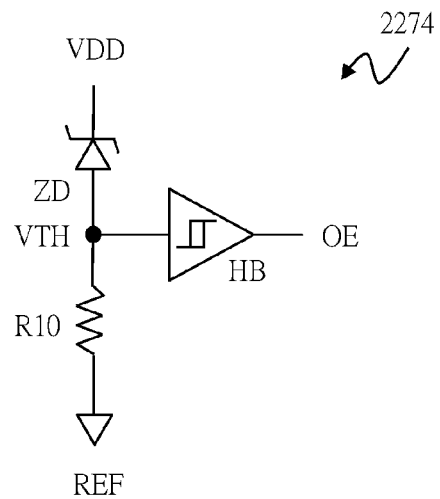
FIG. 13 shows a more specific embodiment of a hysteresis comparison circuit 2274 of the present invention.

FIG. 13 shows a more specific embodiment of a hysteresis comparison circuit 2274 in the determination circuit 2273 of the present invention. As shown in the figure, the hysteresis comparison circuit 2274 includes a Zener diode ZD, a resistor R10, and a hysteresis buffer HB. One terminal of the Zener diode ZD receives the internal supply voltage VDD, and the other terminal of Zener diode ZD is connected to the resistor R10. The resistor R10 has one end electrically connected to the Zener diode ZD and the other end electrically connected to the reference level REF. The voltage drop across the resistor R10 is the threshold voltage VTH. The hysteresis buffer HB is electrically connected between the resistor 10 and the Zener diode ZD, for generating the enable signal OE. The threshold VTH can be determined by the parameters of the Zener diode ZD and the hysteresis buffer HB, such that the threshold VTH can be related to the lower limit voltage VOL. In this embodiment, when the output voltage Vout dos not reach the lower limit voltage VOL, the tri-state buffer 2283 is disabled, so that the flyback power converter 200 operates in the low voltage operation mode; and when the output voltage Vout reaches the lower limit voltage VOL, the tri-state buffer 2283 is enabled, so that the flyback power converter 200 operates in the normal operation mode.

Figure 14:
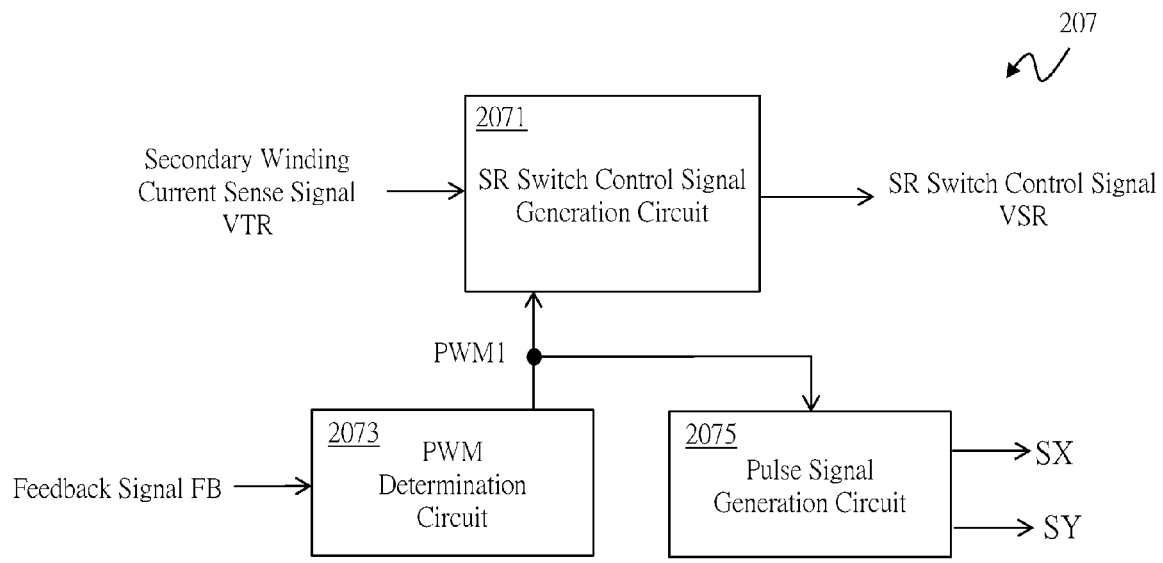
FIG. 14 shows an embodiment of a controller 207 of the present invention.

FIG. 14 shows an embodiment of the controller 207 of the present invention. The controller 207 includes an SR switch control signal generation circuit 2071, a PWM signal generation circuit 2073, and a pulse signal generation circuit 2075. The SR switch control signal generation circuit 2071 generates the SR switch control signal VSR for example according to the voltage drop sense signal VTR and/or a pulse width modulation (PWM) signal PWM1, to control the SR switch 208. The PWM signal generation circuit 2073 is coupled to the SR switch control signal generation circuit 2071, for generating the PWM signal PWM1 according to the feedback signal FB which is related to the output voltage Vout or related to the output current Iout. The pulse signal generation circuit 2075 generates the ON pulse signal SX according to a level change of the PWM signal PWM1 in a first direction, and generates the OFF pulse signal SY according to a level change of the PWM signal in a second direction. Referring to FIG. 3, the level change in the first direction is for example the PWM signal in FIG. 3 (corresponding to the PWM signal PWM1 in this embodiment) changing from the low level to the high level, and the level change in the second direction is for example the PWM signal in FIG. 3 changing from the high level to the low level.

Figure 15:
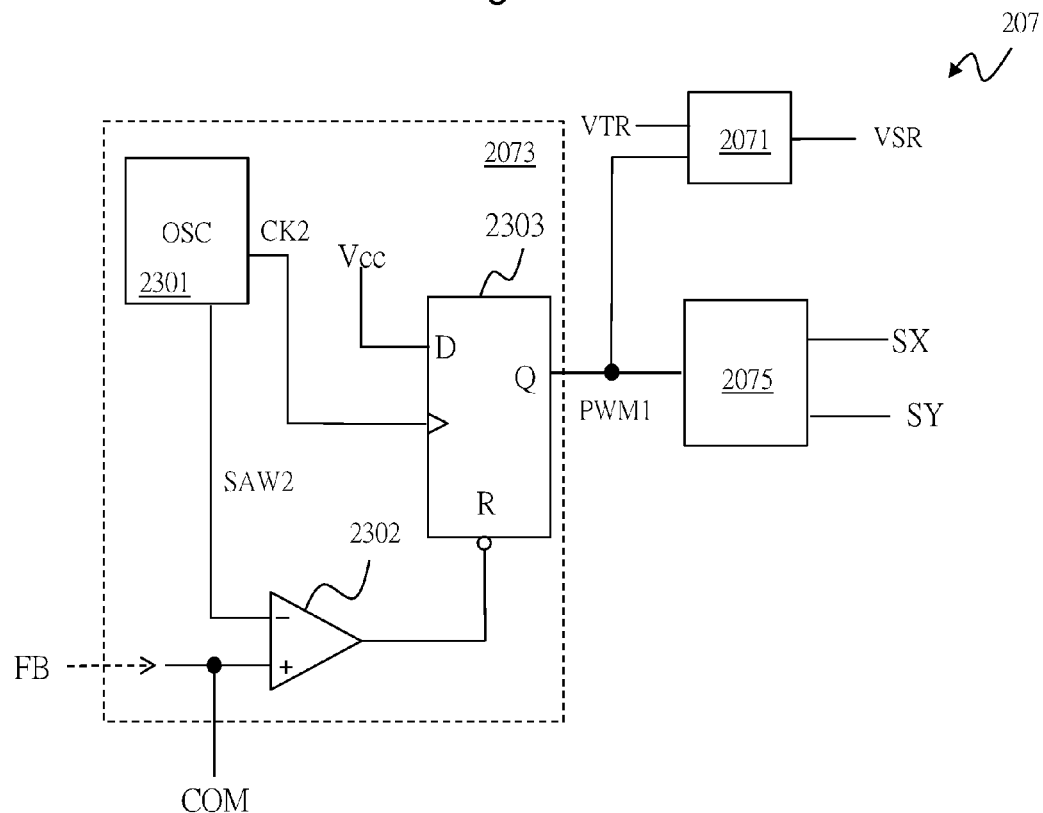
FIG. 15 shows another embodiment of the controller of the present invention.

FIG. 15 shows an embodiment of the controller 207 of the present invention. The PWM signal generation circuit includes an oscillator 2301, a comparator 2302, and a flip-flop 2303. The oscillator 2301 generates a clock signal CK2 and a ramp signal SAW2. The comparator 2302 is coupled to the oscillator 2301, for generating a reset signal R according to the feedback signal FB and the ramp signal SAW2. The flip-flop 2303 is coupled to the oscillator 2301 and the comparator 2302, for generating the PWM signal PWM1 according to the clock signal CK2 and the reset signal R, and an internal voltage Vcc.

Figure 16:
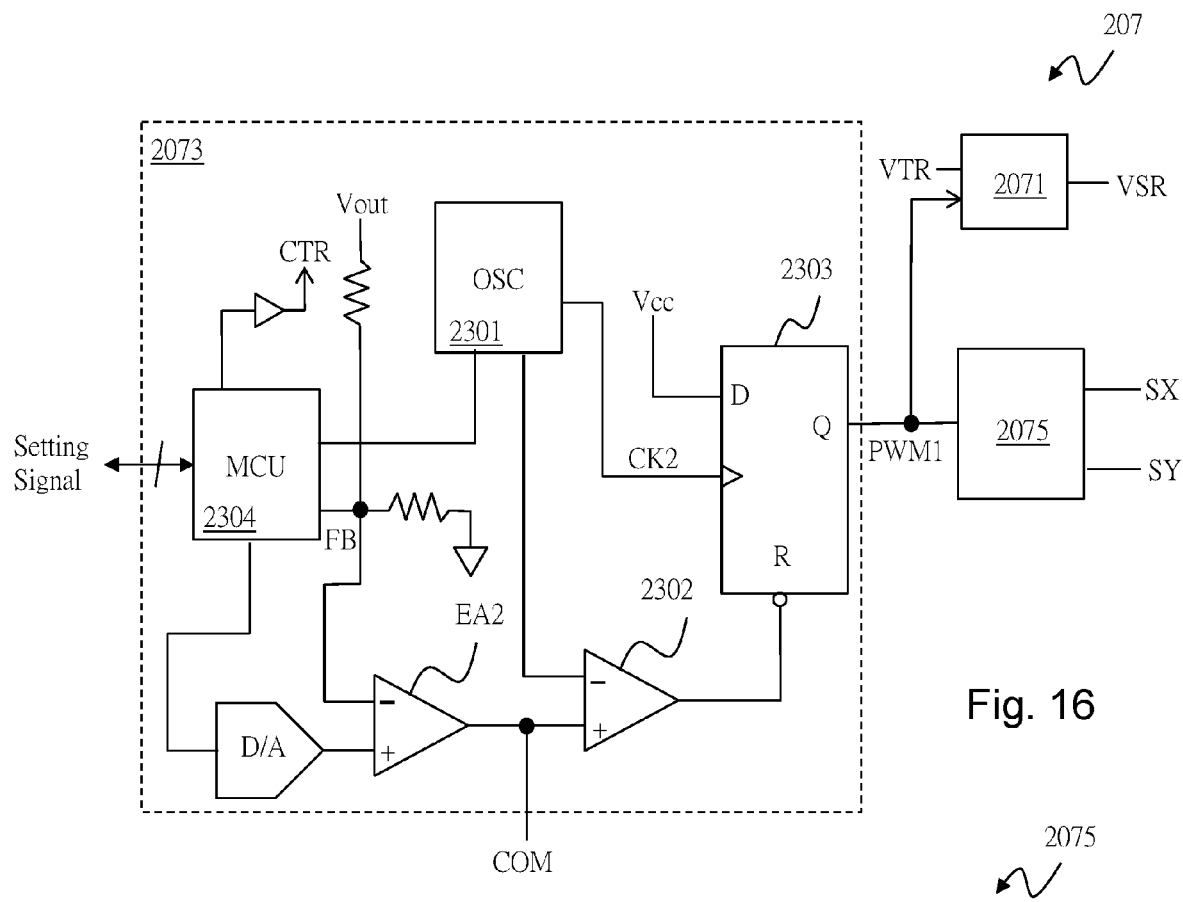
FIG. 16 shows a more specific embodiment of the controller 207 of the present invention.

FIG. 16 shows a more specific embodiment of the controller 207 of the present invention. This embodiment is different from the embodiment shown in FIG. 15 in that, in this embodiment, the PWM signal generation circuit 2073 further includes a micro-processor control unit (MCU) 2304, which receives a setting signal for setting a target level of the output voltage Vout, and the PWM signal generation circuit 2073 adjusts the PWM signal PWM1 further according to the target level. The flyback power converter 200 further includes a voltage drop sense circuit, such as a resistor Rtr shown in FIG. 4, which is coupled between the secondary winding W2 and the controller 207, for generating the voltage drop sense signal VTR according to a voltage drop across the SR switch 208. The voltage drop sense signal VTR is inputted to the SR switch control signal generation circuit 2071, and the controller 207 generates the SR switch control signal VSR to control the SR switch 208 according to the voltage drop sense signal VTR.

Figure 17:
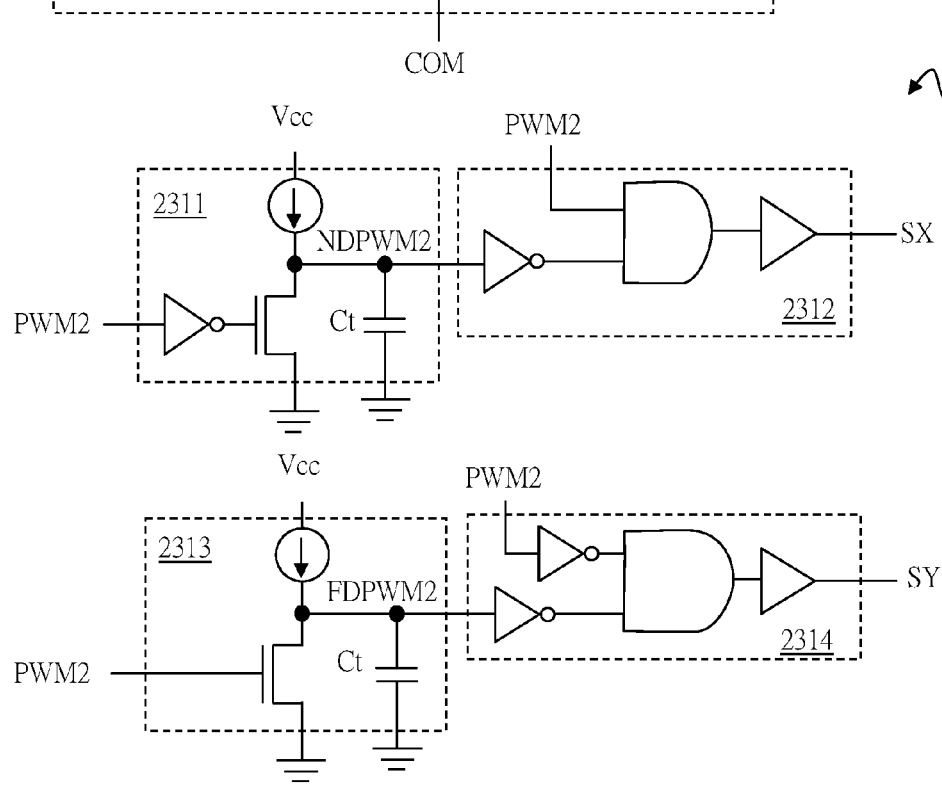
FIG. 17 shows a more specific embodiment of a pulse signal generation circuit 2075 of the present invention.

FIG. 17 shows a more specific embodiment of a pulse signal generation circuit 2075 of the present invention. As shown in the figure, the pulse signal generation circuit 2075 includes an ON delay circuit 2311, an ON logic circuit 2312, an OFF delay circuit 2313, and an OFF logic circuit 2314. The ON delay circuit 2311 is coupled to the PWM signal generation circuit 2073, for delaying an inverted signal of the PWM signal PWM2 for a pulse period, to generate an ON delay PWM signal NDPWM2. The ON logic circuit 2312 is coupled to the ON delay circuit 2311, for performing a logic operation according to the PWM signal PWM2 and the ON delay PWM signal NDPWM2, to generate the ON pulse signal SX according to the level change of the PWM signal PWM2 in the first direction (such as the PWM signal changing from the low level to the high level as shown in FIG. 3). The OFF delay circuit 2313 is coupled to the PWM signal generation circuit 2073, for delaying the PWM signal PWM2 for the pulse period, to generate an OFF delay PWM signal FDPWM2. The OFF logic circuit 2314 is coupled to the OFF delay circuit 2313, for performing a logic operation according to the inverted signal of the PWM signal PWM2 and the OFF delay PWM signal FDPWM2, to generate the OFF pulse signal SY according to the level change of the PWM signal PWM2 in the second direction (such as the PWM signal changing from the high level to the low level as shown in FIG. 3). The ON logic circuit 2312 includes for example but not limited to a NOT logic gate and an AND logic gate as shown in the figure, and a buffer. The OFF logic circuit 2314 includes for example but not limited to two NOT logic gates and an AND logic gate as shown in the figure, and a buffer.

Figure 18:
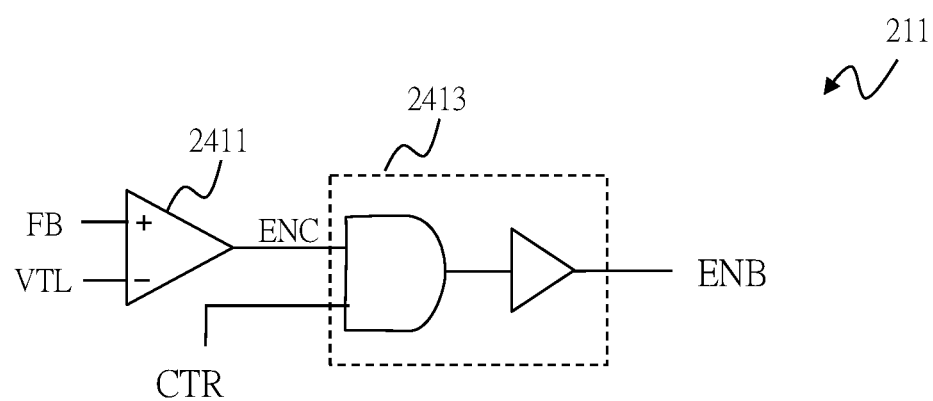
FIG. 18 shows a more specific embodiment of a blocking circuit 211 of the present invention.

FIG. 18 shows a more specific embodiment of a blocking circuit 211 of the present invention. In one embodiment, the controller 207 further includes the blocking circuit 211, for controlling a blocking switch 210 in FIG. 4. The blocking circuit 211 includes a blocking comparator 2411 and a blocking logic circuit 2413. The blocking comparator 2411 generates a blocking comparison signal ENC according to the feedback signal FB and a threshold voltage VTL which is related to the lower limit voltage VOL. The blocking logic circuit 2413 is coupled to the blocking comparator 2411; it includes for example but not limited to an AND logic gate. In one embodiment, the blocking comparison signal ENC can be outputted as the enable loading signal. In another embodiment, the blocking logic circuit 2413 preferably performs a logic operation on the blocking comparison signal ENC with a blocking control signal CTR, to generate an enable loading signal ENB. The enable loading signal ENB is for operating the blocking switch 210, to control whether to block or not to block converting the output voltage Vout to the load voltage Vbus, for supplying electrical power to the load circuit (referring to FIG. 4). In one embodiment, the MCU 2304 (FIG. 16) generates the blocking control signal CTR, and when the output voltage Vout reaches the lower limit voltage VOL, the blocking logic circuit 2413 generates the enable loading signal ENB according to the blocking control signal CTR, to turn the blocking switch 210, so as to convert the output voltage Vout to the load voltage Vbus.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, a device or circuit which does not substantially influence the primary function of a signal can be inserted between any two devices or circuits in the shown embodiments, so the term "couple" should include direct and indirect connections. For another example, the resistors or the voltage divider circuit is not limited to a circuit formed by passive devices, but it may be formed by other circuits, such as transistors. For another example, inverted and non-inverted input terminals of the error amplifier circuit and the comparison circuit are interchangeable, with corresponding amendments of the circuits processing these signals. For another example, when an external signal of the controller (for example but not limited to the feedback signal) is obtained and processed by the controller, a voltage-to-current conversion, a current-to-voltage conversion, or/and a ratio conversion, etc. may be performed on the external signal, and therefore, to perform an action "according to an original signal" in the present invention, is not limited to performing an action strictly according to the original signal itself, but can be performing an action according to a signal which is converted from the original signal, for example by one or more of the aforementioned conversions. For another example, it is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. For example, the level shifter circuit 2101 can be applied to other embodiments. In view of the foregoing, the spirit of the present invention should cover all such and other modifications and variations, which should be interpreted to fall within the scope of the following claims and their equivalents.

What is claimed is:

1. A flyback power converter, comprising:
   a transformer, which includes:
      a primary winding, configured to operably receive an input voltage; and
      a secondary winding, configured to operably generate an output voltage;
   a power switch, which is coupled to the primary winding, and configured to operably control a conduction time of the primary winding;
   a driver, which is located at a primary side of the transformer, and configured to operably generate a switching signal to control the power switch;
   a synchronous rectification (SR) switch, which is coupled to the secondary winding, and configured to operably control a conduction time of the secondary winding in correspondence to a nonconductive time of the primary winding;
   a controller, which is coupled to the SR switch and located at a secondary side of the transformer, and configured to operably control the SR switch and generate an ON pulse signal and an OFF pulse signal in a normal operation mode; and
   a signal coupler circuit, which is coupled between the controller and the driver, and configured to operably convert the ON pulse signal and the OFF pulse signal to an ON trigger signal and an OFF trigger signal respectively, which are inputted to the driver;
   wherein when the output voltage reaches or exceeds a lower limit voltage, the flyback power converter operates in the normal operation mode, and in the normal operation mode, the driver generates the switching signal wherein a start conduction time point and an end conduction time point of the primary winding are determined according to the ON trigger signal and the OFF trigger signal respectively.

2. The flyback power converter of claim 1, wherein the signal coupler circuit includes a pulse transformer or a pulse opto-coupler, wherein input signals and output signals of the pulse transformer and the pulse opto-coupler are signals in a pulse form.

3. The flyback power converter of claim 1, wherein the transformer further includes an auxiliary winding, configured to operably generate an auxiliary voltage according to the output voltage.

4. The flyback power converter of claim 3, further comprising a rectifier filter circuit, configured to operably generate an internal supply voltage for supplying electrical power to the driver according to the auxiliary voltage.

5. The flyback power converter of claim 1, wherein when the output voltage does not reach the lower limit voltage, the flyback power converter operates in a low voltage operation mode, and the driver includes:
- a low voltage mode ON time control circuit, configured to operably determine the start conduction time point and the end conduction time point of the primary winding in the low voltage operation mode, wherein the low voltage mode ON time control circuit is disabled in the normal operation mode;
- a normal mode ON time control circuit, which is coupled to the signal coupler circuit, and configured to operably determine the start conduction time point and the end conduction time point of the primary winding in the normal operation mode; and
- a switching signal generation circuit, which is coupled to the low voltage mode ON time control circuit and the normal mode ON time control circuit, and configured to operably generate the switching signal for controlling the power switch.

6. The flyback power converter of claim 5, wherein the switching signal generation circuit includes a flip-flop circuit.

7. The flyback power converter of claim 5, wherein the low voltage mode ON time control circuit includes:
- a sample-and-hold circuit, which is configured to operably sample and hold a signal related to the output voltage, to generate a sample-and-hold signal;
- an operation mode switching signal generation circuit, configured to operably generate an operation mode switching signal according to the ON trigger signal and/or the OFF trigger signal and the sample-and-hold signal;
- an oscillator circuit, which is coupled to the operation mode switching signal generation circuit, and configured to operably generate a clock signal and a ramp signal according to the operation mode switching signal;
- a comparator, which is coupled to the oscillator circuit and the operation mode switching signal generation circuit, and configured to operably generate a comparison signal according to the ramp signal, the operation mode switching signal, and a low voltage operation mode reference voltage;
- an OFF logic circuit, which is coupled to the comparator, and configured to operably generate a reset signal according to the comparison signal and the OFF trigger signal, wherein the reset signal is inputted to the flip-flop circuit; and
- an ON logic circuit, which is coupled to the oscillator circuit, and configured to operably generate an enable signal according to the clock signal and the ON trigger signal, wherein the enable signal is inputted to the flip-flop circuit;

wherein when the sample-and-hold signal indicates that the output voltage is not lower than the lower limit voltage, or when the ON trigger signal indicates the start conduction time point and/or the OFF trigger signal indicates the end conduction time point of the primary winding, the operation mode switching signal disables the oscillator circuit not to generate the clock signal and the ramp signal, such that the switching signal is generated not according to the clock signal and the ramp signal, and the flyback power converter operates in the normal operation mode;

wherein when the sample-and-hold signal indicates that the output voltage is lower than the lower limit voltage, and when the ON trigger signal and the OFF trigger signal do not indicate the start conduction time point nor the end conduction time point of the primary winding, the operation mode switching signal enables the oscillator circuit to generate the clock signal and the ramp signal, such that the switching signal is generated according to the clock signal and the ramp signal, and the flyback power converter operates in the low voltage operation mode.

8. The flyback power converter of claim 7, wherein the oscillator circuit includes:
- a ramp signal generation circuit, which includes a capacitor, and configured to operably generate the ramp signal by charging and discharging the capacitor according to the clock signal and an inverted signal of the clock signal; and
- a comparator-and-logic circuit, which is coupled to the ramp signal generation circuit, and configured to operably compare the ramp signal with a high trip-point voltage, and compare the ramp signal with a low trip-point voltage, and perform a logic operation according to comparison results, to generate the clock signal and the inverted signal of the clock signal.

9. The flyback power converter of claim 8, wherein the operation mode switching signal generation circuit includes a disable circuit, which is coupled to the capacitor, and configured to operably compare the sample-and-hold signal with a threshold voltage, to control a discharge switch to discharge the capacitor to a reference level when the output voltage is not lower than the lower limit voltage, whereby the oscillator circuit is disabled and does not generate the clock signal and the ramp signal, such that the switching signal is generated not according to the clock signal and the ramp signal, and the flyback power converter operates in the normal operation mode.

10. The flyback power convert er of claim 7, wherein the low voltage mode ON time control circuit further includes an analog signal adder amplifier, which is coupled to the oscillator circuit and a current sense circuit, and configured to operably generate a summation amplified voltage signal according to the ramp signal and a current sense signal generated by the current sense circuit;
- wherein the summation amplified voltage signal is proportional to the current sense signal, or proportional to a sum of the current sense signal and the ramp signal, by a predetermined ratio;
- wherein the current sense circuit is coupled to the power switch, and configured to operably generate the current sense signal according to a switch current flowing through the power switch.

11. The flyback power converter of claim 6, wherein the normal mode ON time control circuit includes:
- a level shifter circuit, which is coupled to the signal coupler circuit, and configured to operably generate an ON trigger level shift signal and an OFF trigger level shift signal according to the ON trigger signal and the OFF trigger signal respectively; and
- a determination circuit, configured to operably generate an enable signal according to an internal supply voltage related to the output voltage;

wherein the flip-flop circuit is configured to operably determine the switching signal according to the ON trigger level shift signal and the OFF trigger level shift signal.

12. The flyback power converter of claim 11, wherein the switching signal generation circuit further includes a tri-state buffer, which is coupled to the flip-flop circuit and the determination circuit, wherein the tri-state buffer is enabled when the output voltage is not lower than the lower limit voltage, and the enablement of the tri-state buffer disables the low voltage mode ON time control circuit, such that the switching signal is determined according to the ON trigger signal and the OFF trigger signal.

13. The flyback power converter of claim 1, wherein the controller includes:
an SR switch control signal generation circuit, configured to operably generate an SR switch control signal according to a voltage drop sense signal and/or a pulse width modulation (PWM) signal, to control the SR switch;
a PWM signal generation circuit, which is coupled to the SR switch control signal generation circuit, and configured to operably generate the PWM signal according to a feedback signal which is related to the output voltage or related to an output current; and
a pulse signal generation circuit, configured to operably generate the ON pulse signal according to a level change of the PWM signal in a first direction, and generate the OFF pulse signal according to a level change of the PWM signal in a second direction.

14. The flyback power converter of claim 13, further comprising a voltage drop sense circuit, which is coupled between the secondary winding and the controller, and configured to operably generate the voltage drop sense signal according to a voltage drop across the SR switch.

15. The flyback power converter of claim 14, wherein the PWM signal generation circuit includes:
an oscillator, configured to operably generate a clock signal and a ramp signal;
a comparator, which is coupled to the oscillator, and configured to operably generate a reset signal according to the feedback signal and the ramp signal; and
a flip-flop, which is coupled to the oscillator and the comparator, and configured to operably generate the PWM signal according to the clock signal and the reset signal.

16. The flyback power converter of claim 14, wherein the pulse signal generation circuit includes:
an ON delay circuit, which is coupled to the PWM signal generation circuit, and configured to operably delay an inverted signal of the PWM signal for a pulse period, to generate an ON delay PWM signal;
an ON logic circuit, which is coupled to the ON delay circuit, and configured to operably perform a logic operation according to the PWM signal and the ON delay PWM signal, to generate the ON pulse signal according to the level change of the PWM signal in the first direction;
an OFF delay circuit, which is coupled to the PWM signal generation circuit, and configured to operably delay the PWM signal for the pulse period, to generate an OFF delay PWM signal; and
an OFF logic circuit, which is coupled to the OFF delay circuit, and configured to operably perform a logic operation according to the inverted signal of the PWM signal and the OFF delay PWM signal, to generate the OFF pulse signal according to the level change of the PWM signal in the second direction.

17. The flyback power converter of claim 14, wherein the PWM signal generation circuit further includes a microprocessor control unit (MCU), which is configured to operably receive a setting signal for setting a target level of the output voltage, wherein the PWM signal generation circuit adjusts the PWM signal further according to the target level.

18. The flyback power converter of claim 17, wherein the controller further includes a blocking circuit including:
a blocking comparator, configured to operably generate a blocking comparison signal according to the feedback signal and a threshold voltage which is related to the lower limit voltage; and
a blocking logic circuit, which is coupled to the blocking comparator, and configured to operably perform a logic operation on the blocking comparison signal with a blocking control signal generated by the MCU, to generate an enable loading signal;
wherein the enable loading signal is for operating a blocking switch, to control whether the output voltage is converted to a load voltage supplied to a load circuit;
wherein the blocking logic circuit generates the enable loading signal according to the blocking control signal when the output voltage reaches the lower limit voltage, to determine ON or OFF of the blocking switch, so as to determine whether to block or not to block converting the output voltage to the load voltage.

19. A controller of a flyback power converter, wherein the flyback power converter includes: a transformer which has a primary winding, configured to operably receive an input voltage, and a secondary winding, configured to operably generate an output voltage; a power switch, which is coupled to the primary winding, and configured to operably control a conduction time of the primary winding; a driver, which is located at a primary side of the transformer, and configured to operably generate a switching signal to control the power switch; a synchronous rectification (SR) switch, which is coupled to the secondary winding, and configured to operably control a conduction time of the secondary winding in correspondence to a nonconductive time of the primary winding; the controller, which is coupled to the SR switch and located at a secondary side of the transformer, and configured to operably control the SR switch and generate an ON pulse signal and an OFF pulse signal in a normal operation mode; and a signal coupler circuit, which is coupled between the controller and the driver, and configured to operably convert the ON pulse signal and the OFF pulse signal to an ON trigger signal and an OFF trigger signal respectively, which are inputted to the driver; wherein when the output voltage reaches or exceeds a lower limit voltage, the flyback power converter operates in the normal operation mode, and in the normal operation mode, the driver generates the switching signal wherein a start conduction time point and an end conduction time point of the primary winding are determined according to the ON trigger signal and the OFF trigger signal respectively; the controller comprising:
a synchronous rectification (SR) switch control signal generation circuit, configured to operably generate an SR switch control signal according to a voltage drop sense signal and/or a pulse width modulation (PWM) signal, to control the SR switch;
a PWM signal generation circuit, which is coupled to the SR switch control signal generation circuit, and configured to operably generate the PWM signal according to a feedback signal which is related to the output voltage or related to an output current; and a pulse signal generation circuit, configured to operably generate the ON pulse signal according to a level change of the PWM signal in a first direction, and generate the OFF pulse signal according to a level change of the PWM signal in a second direction which is opposite to the first direction.

20. The controller of claim 19, wherein the PWM signal generation circuit includes:

an oscillator, configured to operably generate a clock signal and a ramp signal;

a comparator, which is coupled to the oscillator, and configured to operably generate a reset signal according to the feedback signal and the ramp signal; and a flip-flop, which is coupled to the comparator, and configured to operably generate the PWM signal according to the clock signal and the reset signal.

21. The controller method of claim 19, wherein the pulse signal generation circuit includes:

an ON delay circuit, which is coupled to the PWM signal generation circuit, and configured to operably delay an inverted signal of the PWM signal for a pulse period, to generate an ON delay PWM signal;

an ON logic circuit, which is coupled to the ON delay circuit, and configured to operably perform a logic operation according to the PWM signal and the ON delay PWM signal, to generate the ON pulse signal according to the level change of the PWM signal in the first direction;

an OFF delay circuit, which is coupled to the PWM signal generation circuit, and configured to operably delay the PWM signal for a pulse period, to generate an OFF delay PWM signal; and an OFF logic circuit, which is coupled to the OFF delay circuit, and configured to operably perform a logic operation according to the inverted signal of the PWM signal and the OFF delay PWM signal, to generate the OFF pulse signal according to the level change of the PWM signal in the second direction.

22. The controller of claim 19, wherein the PWM signal generation circuit further includes a micro-processor control unit (MCU), which is configured to operably receive a setting signal, wherein the setting signal is for setting a target level of the output voltage, wherein the PWM signal generation circuit adjusts the PWM signal further according to the target level.

23. The controller of claim 22, further comprising a blocking circuit including:

a blocking comparator, configured to operably generate a blocking comparison signal according to the feedback signal and a threshold voltage which is related to the lower limit voltage; and a blocking logic circuit, which is coupled to the blocking comparator, and configured to operably perform a logic operation on the blocking comparison signal with a blocking control signal generated by the MCU, to generate an enable loading signal;

wherein the enable loading signal is for operating a blocking switch, to control whether the output voltage is converted to a load voltage supplied to a load circuit;

wherein the blocking logic circuit generates the enable loading signal according to the blocking control signal when the output voltage reaches the lower limit voltage, to determine ON or OFF of the blocking switch, so as to determine whether to block or not to block converting the output voltage to the load voltage.

24. A driver of a flyback power converter, wherein the flyback power converter includes: a transformer, which has a primary winding, configured to operably receive an input voltage, and a secondary winding, configured to operably generate an output voltage; a power switch, which is coupled to the primary winding, and configured to operably control a conduction time of the primary winding; the driver, which is located at a primary side of the transformer, and configured to operably generate a switching signal to control the power switch; a synchronous rectification (SR) switch, which is coupled to the secondary winding, and configured to operably control a conduction time of the secondary winding corresponding to a nonconductive time of the primary winding; a controller, which is coupled to the SR switch and located at a secondary side of the transformer, and configured to operably control the SR switch and generate an ON pulse signal and an OFF pulse signal in a normal operation mode; and a signal coupler circuit, which is coupled between the controller and the driver, and configured to operably convert the ON pulse signal and the OFF pulse signal to an ON trigger signal and an OFF trigger signal respectively, which are inputted to the driver; wherein when the output voltage reaches or exceeds a lower limit voltage, the flyback power converter operates in the normal operation mode, and in the normal operation mode, the driver generates the switching signal wherein a start conduction time point and an end conduction time point of the primary winding are determined according to the ON trigger signal and the OFF trigger signal respectively; the driver comprising:

a low voltage mode ON time control circuit, configured to operably determine the start conduction time point and the end conduction time point of the primary winding in the low voltage operation mode, wherein the low voltage mode ON time control circuit is disabled in the normal operation mode;

a normal mode ON time control circuit, which is coupled to the signal coupler circuit, and configured to operably determine the start conduction time point and the end conduction time point of the primary winding in the normal operation mode; and a switching signal generation circuit, which is coupled to the low voltage mode ON time control circuit and the normal mode ON time control circuit, and configured to operably generate the switching signal for controlling the power switch.

25. The driver of claim 24, wherein the switching signal generation circuit includes a flip-flop circuit.

26. The driver of claim 24, wherein the low voltage mode ON time control circuit includes:

a sample-and-hold circuit, which is configured to operably sample and hold a signal related to the output voltage, to generate a sample-and-hold signal;

an operation mode switching signal generation circuit, configured to operably generate an operation mode switching signal according to the ON trigger signal and/or the OFF trigger signal and the sample-and-hold signal;

an oscillator circuit, which is coupled to the operation mode switching signal generation circuit, and configured to operably generate a clock signal and a ramp signal according to the operation mode switching signal;

a comparator, which is coupled to the oscillator circuit and the operation mode switching signal generation circuit, and configured to operably generate a comparison signal according to the ramp signal, the operation mode switching signal, and a low voltage operation mode reference voltage;

an OFF logic circuit, which is coupled to the comparator, and configured to operably generate a reset signal according to the comparison signal and the OFF trigger signal, wherein the reset signal is inputted to the flip-flop circuit; and an ON logic circuit, which is coupled to the oscillator circuit, and configured to operably generate an enable signal according to the clock signal and the ON trigger signal, wherein the enable signal is inputted to the flip-flop circuit;

wherein when the sample-and-hold signal indicates that the output voltage is not lower than the lower limit voltage, or when the ON trigger signal indicates the start conduction time point and/or the OFF trigger signal indicates the end conduction time point of the primary winding, the operation mode switching signal disables the oscillator circuit not to generate the clock signal and the ramp signal, such that the switching signal is generated not according to the clock signal and the ramp signal, and the flyback power converter operates in the normal operation mode;

wherein when the sample-and-hold signal indicates that the output voltage is lower than the lower limit voltage, and when the ON trigger signal and the OFF trigger signal do not indicate the start conduction time point nor the end conduction time point of the primary winding, the operation mode switching signal enables the oscillator circuit to generate the clock signal and the ramp signal, such that the switching signal is generated according to the clock signal and the ramp signal, and the flyback power converter operates in the low voltage operation mode.

27. The driver of claim 26, wherein the oscillator circuit includes:

a ramp signal generation circuit, which includes a capacitor, and configured to operably generate the ramp signal by charging and discharging the capacitor according to the clock signal and an inverted signal of the clock signal; and a comparator-and-logic circuit, which is coupled to the ramp signal generation circuit, and configured to operably compare the ramp signal with a high trip-point voltage, and compare the ramp signal with a low trip-point voltage, and perform a logic operation according to comparison results, to generate the clock signal and the inverted signal of the clock signal.

28. The driver of claim 27, wherein the operation mode switching signal generation circuit includes a disable circuit, which is coupled to the capacitor, and configured to operably compare the sample-and-hold signal with a threshold voltage, to control a discharge switch to discharge the capacitor to a reference level when the output voltage is not lower than the lower limit voltage, whereby the oscillator circuit is disabled and does not generate the clock signal and the ramp signal, such that the switching signal is generated not according to the clock signal and the ramp signal, and the flyback power converter operates in the normal operation mode.

29. The driver of claim 27, wherein the low voltage mode ON time control circuit further includes an analog signal adder amplifier, which is coupled to the oscillator circuit and a current sense circuit, and configured to operably generate a summation amplified voltage signal according to the ramp signal and a current sense signal generated by the current sense circuit;

wherein the summation amplified voltage signal is proportional to the current sense signal, or proportional to a sum of the current sense signal and the ramp signal, by a predetermined ratio;

wherein the current sense circuit is coupled to the power switch, and configured to operably generate the current sense signal according to a switch current flowing through the power switch.

30. The driver of claim 25, wherein the normal mode ON time control circuit includes:

a level shifter circuit, which is coupled to the signal coupler circuit, and configured to operably generate an ON trigger level shift signal and an OFF trigger level shift signal according to the ON trigger signal and the OFF trigger signal respectively; and a determination circuit, configured to operably generate an enable signal according to an internal supply voltage related to the output voltage;

wherein the flip-flop circuit is configured to operably determine the switching signal according to the ON trigger level shift signal and the OFF trigger level shift signal.

31. The driver of claim 30, wherein the switching signal generation circuit further includes a tri-state buffer, which is coupled to the flip-flop circuit and the determination circuit, wherein the tri-state buffer is enabled when the output voltage is not lower than the lower limit voltage, and the enablement of the tri-state buffer disables the low voltage mode ON time control circuit, such that the switching signal is determined according to the ON trigger signal and the OFF trigger signal.

* * * * *